United States Patent [19]

Kranz

[11] Patent Number: 4,633,967

[45] Date of Patent: Jan. 6, 1987

[54] CIRCUMBENDIBUS SAFETY SYSTEM FOR A VEHICLE

[75] Inventor: William J. Kranz, Yonkers, N.Y.

[73] Assignee: Consolidated Solar Industries Corp., Yonkers, N.Y.

[21] Appl. No.: 617,190

[22] Filed: Jun. 4, 1984

[51] Int. Cl.[4] ........................ B60K 28/10; A62C 25/00

[52] U.S. Cl. ........................................ 180/274; 169/56; 169/62; 220/88 B

[58] Field of Search ............... 180/274, 284, 281, 282, 180/286, 283, 271; 220/88 R, 88 B; 169/60, 61, 62, 56, 66, 67, 68

[56] References Cited

U.S. PATENT DOCUMENTS

| | | | |
|---|---|---|---|
| 3,738,428 | 6/1973 | Ingro | 220/88 B |
| 3,876,011 | 4/1975 | Poitras | 169/62 X |
| 4,215,752 | 8/1980 | Waller | 169/62 X |
| 4,383,579 | 5/1983 | Monk | 169/62 |

FOREIGN PATENT DOCUMENTS

| | | | |
|---|---|---|---|
| 467334 | 6/1937 | United Kingdom | 220/88 B |
| 811750 | 4/1959 | United Kingdom | 220/88 B |

*Primary Examiner*—Harry Tanner

*Attorney, Agent, or Firm*—Rodman & Rodman

[57] ABSTRACT

The circumbendibus safety system is a modular fire prevention system that can be placed in areas of a vehicle where a fire is likely to occur. The system automatically dispenses fire extinguishant into a fuel tank when the vehicle is subject to a predetermined level of impact or when the temperature at a predetermined location in the vehicle is at a predetermined level. Dispensation of fire extinguishant into the fuel tank can also be arranged to occur when two severe conditions are present such as a predetermined level of impact to the vehicle and a predetermined extraordinarily high temperature condition occurs. Other embodiments of the invention include means for detecting a predetermined level of impact to the vehicle, means for detecting predetermined temperature conditions at various locations in the vehicle and flow control devices that control the flow of fire extinguishant to various locations in the vehicle as well as the flow of fuel to the fuel tank and the flow of electricity to the ignition system.

16 Claims, 28 Drawing Figures

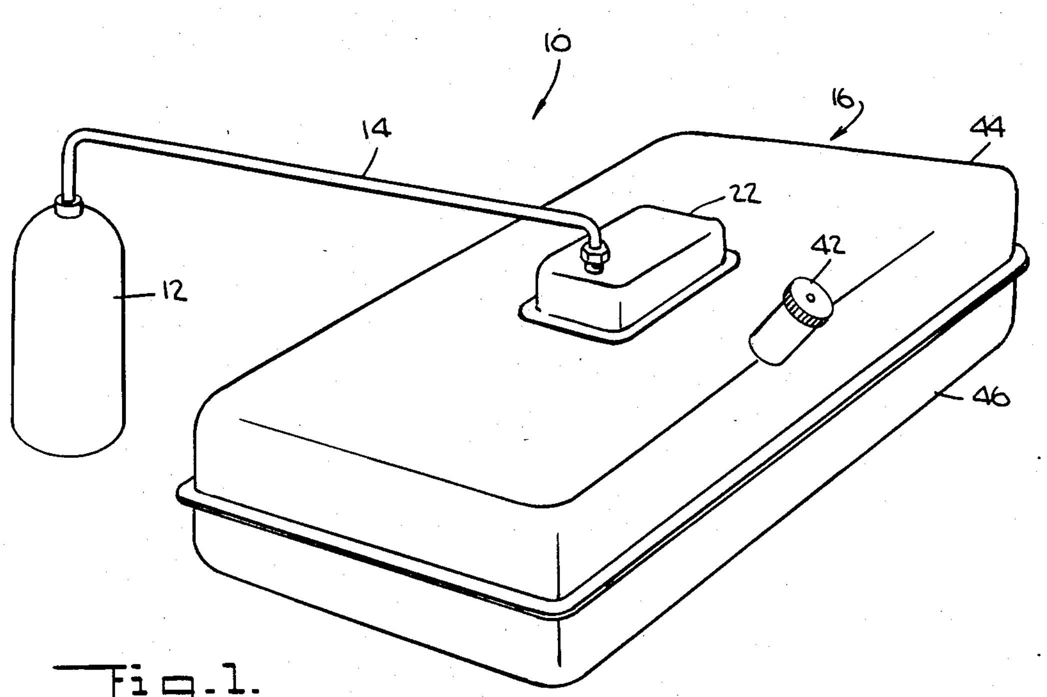
Fig.1.
Fig.2.
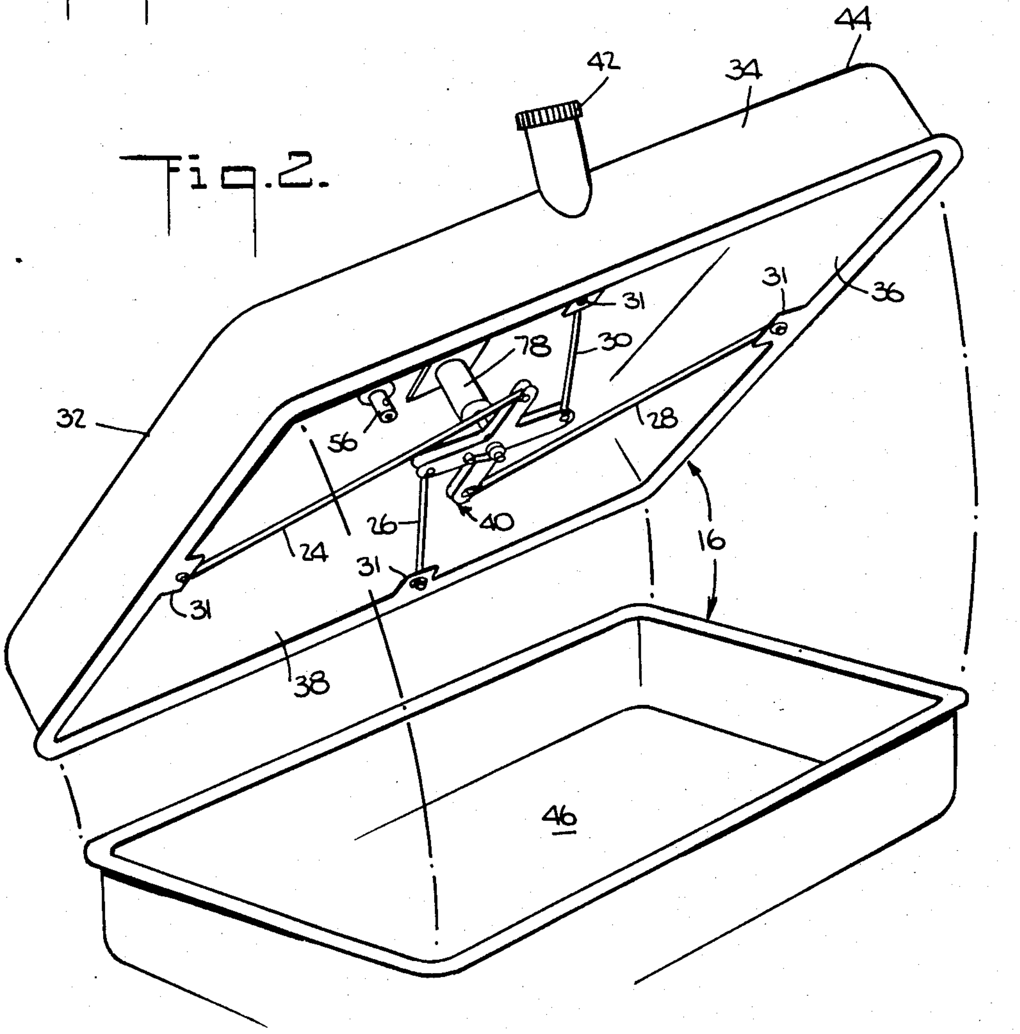

Fig.5.
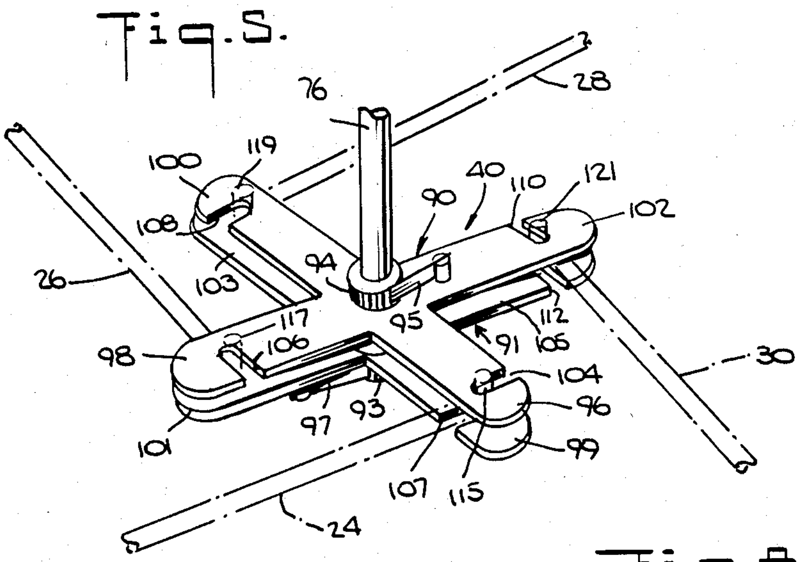
Fig.8.
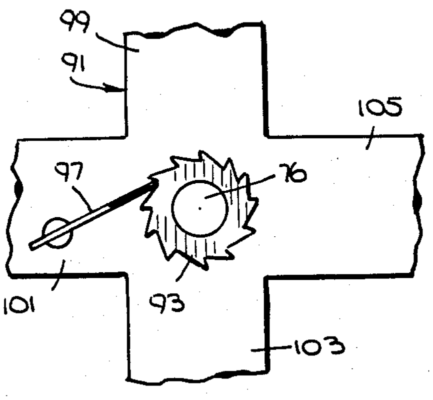
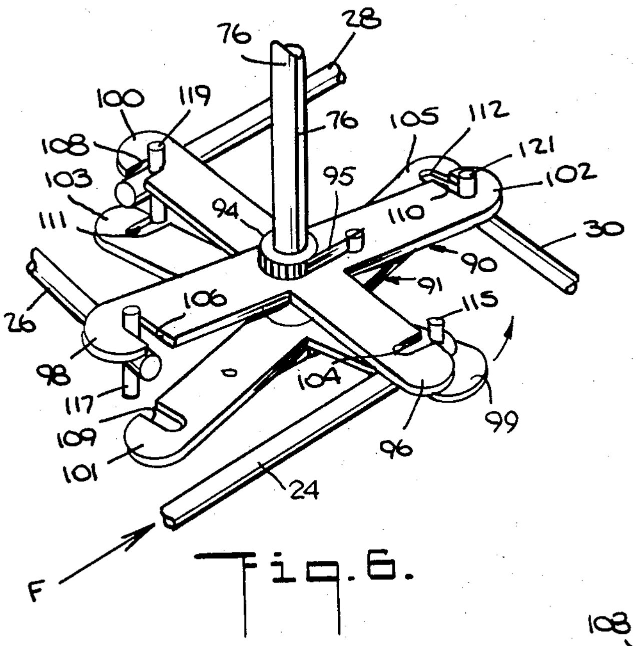
Fig.6.
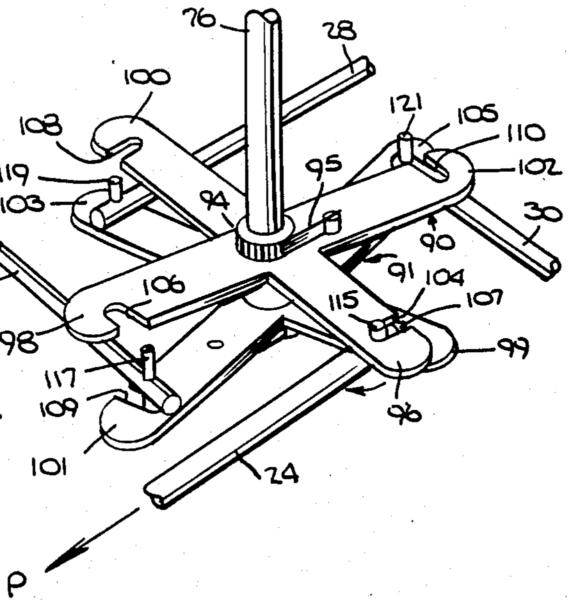
Fig.7.

10
16
22
14
12
490
492
494
496
498
500
502
504
506
508
510
512
514

CIRCUMBENDIBUS SAFETY SYSTEM FOR A VEHICLE

BACKGROUND OF THE INVENTION

This invention relates to safety systems for vehicles such as automobiles, and more particularly to safety systems that prevent the outbreak or spread of fire in the vehicle following a collision or other such extraordinary impact.

It is well known that automobiles are one of the most popular transportation vehicles with current usage ranging in the multi-millions. It is also well known that accidents involving automobiles are quite common, to the extent that nearly every driver at some time in their driving career will be involved in a minor or major accident. The term minor accident is used herein to define a vehicular accident that does not endanger life or limb. The term major accident is used herein to define vehicular accidents which are life endangering due to an extraordinary impact to the vehicle.

The injuries suffered in a major accident are often a direct result of the extraordinary level of impact which the vehicle has been subjected to. However because of the combustibility and explosiveness of fuels commonly used in automobiles there is a high potential for outbreak of fire or an explosion following an extraordinary impact to the vehicle. With safety devices such as seat belts and air bags it is possible to escape serious physical injury due to impact following a major accident. However the outbreak of a fire or an explosion as a consequence of the major accident can have a disastrous effect upon the passengers of the vehicle.

It is thus desirable to provide a fire prevention safety system for vehicles that operates following an extraordinary impact, or at an increased temperature level, or under both of these conditions.

OBJECTS AND SUMMARY OF THE INVENTION

Among the several objects of the invention may be noted the provision of a novel fire prevention safety system for an automobile, a novel fire prevention safety system that dispenses fire extinguishant following an extraordinary impact or at an increased temperature level, a novel safety system that shuts off the ignition system following an extraordinary impact, a novel fire prevention safety system that shuts off the flow of fuel to the engine following an extraordinary impact or at an increased temperature level, or under both of these conditions, a novel safety system that substantially simultaneously dispenses fire extinguishant into a fuel tank, shuts off the flow of fuel to the engine and shuts off the ignition system following an extraordinary impact or at an increased temperature level or under both of these conditions, a novel safety system that simultaneously shuts off the ignition system and either dispenses fire extinguishant or shuts off the flow of fuel to the engine following an extraordinary impact or at an increased temperature level or under both of these conditions, and a novel safety system that simultaneously shuts off the flow of fuel and dispenses fire extinguishant following an extraordinary impact or at an increased temperature level or under both of these conditions.

The present invention relates to safety systems for preventing the outbreak or spread of fire in a vehicle. Another aspect of the invention relates to inhibiting the movement of a vehicle after an accident to prevent unauthorized departure from the scene of the accident.

The safety system is a modular system that is fully automatic and disposable at those areas of the vehicle where a fire is likely to occur. The structure of the safety system is either mounted to the framework of the vehicle or directly onto the components of the vehicle which require direct treatment. The safety system thus focuses upon three specific areas of the vehicle which usually form the sites for a fire, the fuel tank, the engine and the ignition system.

A fuel tank fire prevention system incorporated in the circumbendibus safety system automatically dispenses fire extinguishant into the fuel tank when the vehicle is subject to a predetermined level of impact or when the temperature at a predetermined location in the vehicle at the vicinity of the fuel tank is at a predetermined level. The fuel tank fire prevention system can also be arranged to operate only when both the impact conditions and the high temperature conditions have occurred. This capability of operation under impact conditions, or high temperature conditions or both impact and high temperature conditions is characteristic of all other systems of the invention.

The fuel tank fire prevention system thus includes a valve through which fire extinguishant is dispensed into the fuel tank, sensing means for sensing either a predetermined distortion of the fuel tank or a predetermined temperature level in proximity of the fuel tank or both of these conditions, and transmission means actuatable by the sensing means to move the valve from a normally closed position to an open position when the sensing means has responded to the impact condition, the temperature condition or both such conditions. Impact conditions are sensed by a distortion sensing unit located either inside the fuel tank or outside the fuel tank but arranged to react to a distortion or deformation of some surface portion of the fuel tank. Temperature conditions are sensed by a bimetallic thermal device incorporated in a valve which operates to move the valve from a normally closed position to an open position to permit flowage of fire extinguishant through the valve.

The fire prevention safety system can also include a flow control device that controls two flow functions. For example the flow control device can control the flow of electricity to the ignition system as well as the flow of fire extinguishant or the flow of fuel. In a further embodiment the flow control device is arranged to control the flow of fire extinguishant and the flow of fuel.

In each embodiment of the flow control device the flow functions are implemented or curtailed by a spacer member having a predetermined size and weight and held in equilibrium in a set position when the vehicle is not subject to a predetermined impact. The spacer member is moveable from its set position to an out-of-set position thereby causing the desired change of flow function in simultaneous fashion.

Each embodiment of the flow control device can be reset to its pre-impact condition. However, in a further aspect of the invention, the ignition shut-off switch cannot be reset except by a policeman or other authorized official having a bypass element such as a key that is not ordinarily available to the general public. This arrangement would prevent unauthorized departure from the scene of an accident.

Another embodiment of the flow control device controls the flow of electricity to the ignition system and the flow of fire extinguishant to a predetermined location such as the fuel tank. This flow control device includes a weight member that is shiftable from one position to another position when the vehicle is subject to a predetermined impact level. The flow control device also provides for shifting of the weight member upon temperature conditions reaching a predetermined temperature level. Under either condition, that is, impact or temperature actuation, the flow control device causes movement of a cable attached to a valve which controls the flow of fire extinguishant. The cable is arranged to move to thereby actuate the valve when the weight shifts from its set position to its out-of-set position. Such shifting of movement by the spacer member or weight also accomplishes a change in the switch position of the electrical switch to shut off the electricity to the ignition system.

In all embodiments of the flow control device the spacer member or the weight member is normally maintained in its set position when the vehicle is not subject to an extraordinary impact or an abnormally high temperature level. A fusible link can be included in the flow control device to respond to an abnormally high temperature level by enabling the weight member or spacer member to yield to the force of a biasing spring which causes the spacer member or weight member to move to an out-of-set position. Even if the abnormally high temperature conditions do not occur the weight member or spacer member is movable to its out-of-set position when the vehicle is subject to an extraordinary impact, since the set position of the weight member or spacer member is not a stable equilibrium. Therefore the impact to the automobile at a predetermined impact level will upset or move the spacer member or weight member to its out-of-set position.

In another embodiment of the invention a thermal actuated valve is disposed in proximity of the engine to dispense fire extinguishant at the carburetor area when a predetermined temperature level is sensed by the thermal element of the thermal actuated valve. If desired the fire extinguishant for the thermal actuated valve in the engine compartment can come from the same source as the fire extinguishant for the fuel tank fire prevention system.

The invention accordingly comprises the constructions and methods hereinafter defined, the scope of the invention being indicated in the following claims.

DESCRIPTION OF THE DRAWINGS

In the accompanying drawings,

FIG. 1 is a perspective view of a fuel tank fire prevention system;

FIG. 2 is an exploded view of the fuel tank incorporating the fire prevention system;

FIGS. 5–7 show various positions of a trigger device provided in the fuel tank;

FIG. 8 is an enlarged fragmentary view of the underside of the trigger device of FIG. 5;

Corresponding reference characters indicate corresponding parts throughout the several views of the drawings.

DETAILED DESCRIPTION OF THE INVENTION

Figure 3:
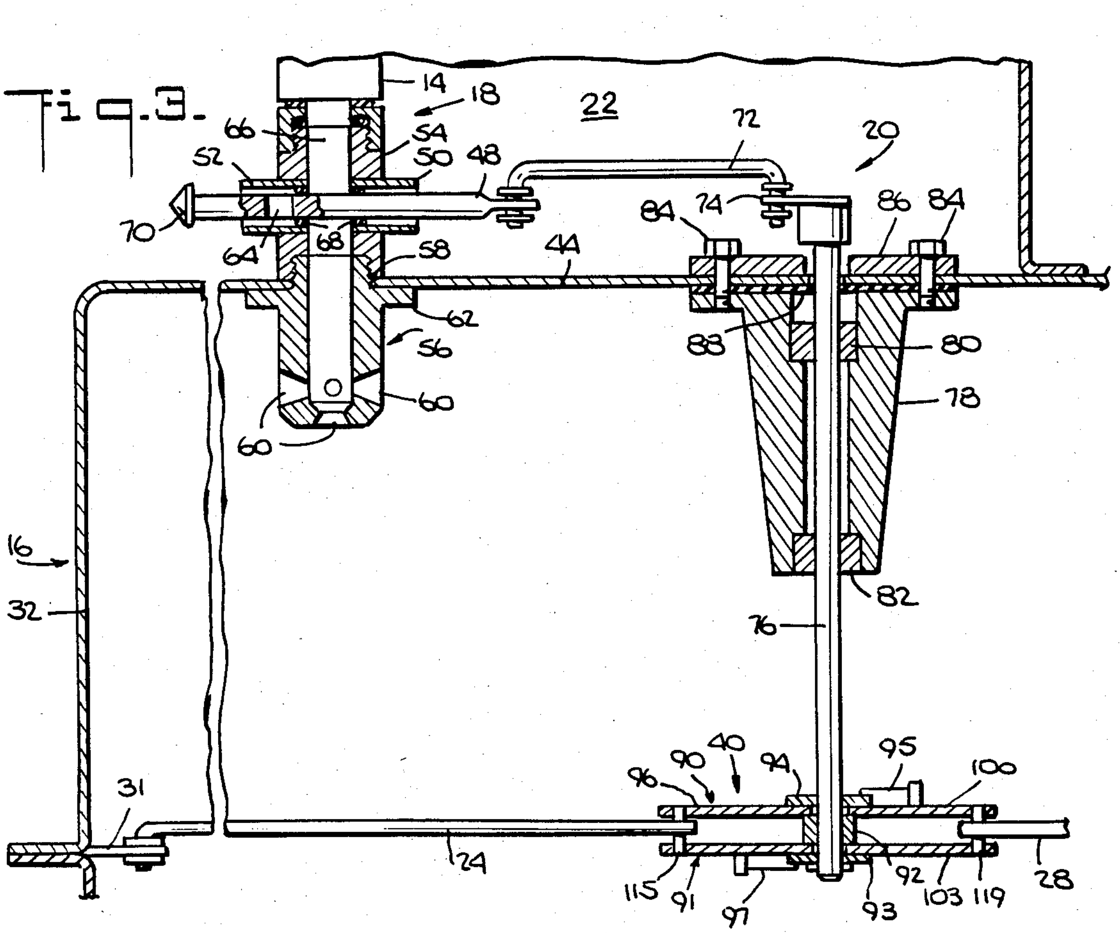
FIG. 3 is a sectional view of the fuel tank fire prevention system prior to dispensation of fire extinguishant.

Referring now to the drawings, the circumbendibus safety system for a vehicle comprises a fuel tank fire prevention system generally indicated by the reference number 10 in FIG. 1.

The system 10 includes a container 12 for fire extinguishant material that flows through a tube 14 into a fuel tank 16. A valve assembly 18 (FIGS. 3 and 4), supported on the fuel tank 16, controls dispensation of the extinguishant into the tank 16. Movement of the valve assembly 18 is governed by a transmission assembly 20 also supported on the fuel tank 16. A protection cover 22 for enclosing the valve assembly 18 and the transmission assembly 20 is detachably secured to the fuel tank 16 in any suitable known manner.

The transmission assembly 18 transmits movement from a distortion sensing means comprising a plurality of distortion sensing rods 24, 26, 28 and 30 disposed inside the fuel tank 16. As shown in FIG. 2, the distortion sensing rods 24, 26, 28 and 30 respectively interconnect the tank walls 32, 34, 36 and 38 with a trigger device 40 of the transmission assembly 20. The strucural constituents of the system 10 and other systems of this invention are preferably formed of materials that will not be deleteriously affected by exposure to fuels commonly used in vehicles such as automobiles.

The container 12 is preferably made of aluminum, and charged with approximately two and one-half pounds of fire extinguishant such as sold under the trade name Halon, since Halon extinguishant is compatible with metals as well as other materials commonly used in fuel systems. In addition, a Halon fire extinguisher weighs approximately 25 percent less than conventional carbon dioxide fire extinguishers with the same rating. Halon extinguishant also evaporates completely without residue and its stated capacity has a discharge time of approximately eight to ten seconds. Once the Halon extinguishant has been dispensed into the fuel tank 16 it can be easily eliminated by removing a fuel cap 42 to vent the fuel tank 16. Complete evaporation of the Halon extinguishant generally takes approximately two hours.

The fuel tank 16 comprises an upper shell portion 44 and a lower shell portion 46 secured together in any suitable known manner, the shell portions 44 and 46 being conventional fuel tank members.

The valve assembly 18, which is supported on the upper shell portion 44 includes a valve closure rod 48 slidably disposed in collars 50 and 52 that are transversely supported in a valve neck 54. The valve neck 54 is threaded to a dispensation member 56 through an opening 58 in the upper shell portion 44. The dispensation member 56 has dispensation openings 60 and a flange 62 that bears against the upper shell portion 44 when the dispensation member 56 is threaded to the valve neck 54.

The valve closure rod 48 is provided with a valve opening 64 that is normally out of alignment with a passageway 66 extending through the valve neck 54 and the dispensation member 56. Any suitable sealing means such as O-rings 68 can be provided at the collars 50 and 52 to provide a leak tight seal around the valve closure rod 48. A conical end portion 70 of the valve closure rod 48 is sized to interfere with the collar 52 and limit further movement of the valve closure rod 48 toward the collar 50 after the valve opening 64 is aligned with the passageway 66.

Movement of the valve closure rod 48 is accomplished by the transmission assembly 20, which comprises a link 72 having one end pivotally joined to the valve closure rod 48 and an opposite end pivotally joined to a swivel flange 74 provided at one end of a swivel axle 76. The swivel axle 76 is supported for rotation in a swivel mcunt 78 having nylon bearings 80 and 82 of any suitable known construction. The swivel mount 78 is secured to the upper shell 44 of the fuel tank 16 by fasteners 84 extending through a plate 86. A gasket 88 is provided between the swivel mounts 78 and the upper shell 44. The trigger device 40, is provided at an opposite end portion of the swivel axle 76.

The trigger device 40 includes a trigger wheel member 90 rotatably mounted on the swivel axle 76 between a bearing member 92 and a ratchet 94 that is keyed or otherwise affixed to the swivel axle 76. A pawl 95 is fixed to the trigger wheel 90 for engagement with the ratchet 94.

As seen most clearly in FIGS. 5–7, the trigger wheel 90 is cross-shaped and has four arms 96, 98, 100 and 102. Each arm 96, 98, 100 and 102 has a free end portion with respective transverse notches 104, 106, 108 and 110. The notches 104, 106, 108 and 110 are sized to respectively accommodate drive bars 115, 117, 119 and 121 provided at one end of the distortion sensing rods 24, 26, 28 and 30. The other end of the distortion sensing rods 24, 26, 28 and interconnect with pivot mounts 31 provided at the fuel tank walls 32, 34, 36 and 38.

The trigger device 40 also includes a trigger wheel member 91 rotatably mounted on the swivel axle 76 between the bearing member 92 and a ratchet 93 that is affixed to the swivel axle 76. A pawl 97 is fixed to the trigger wheel member 91 for engagement with the ratchet 93.

The trigger wheel 91 corresponds to the trigger wheel 90 in being cross-shaped, having four arms, 99, 101, 103 and 105. Each arm 99, 101, 103 and 105 has a free end portion with respective transverse notches 107, 109, 111 and 112 that open in a direction opposite that of the notches 104, 106, 108 and 110. The notches 107, 109, 111 and 112 are sized to respectively accommodate the drive bars 115, 117, 119 and 121.

The distortion sensing rods 24, 26, 28 and 30 thus have one end pivotally connected to the side walls 32, 34, 36 and 38 of the fuel tank 16 at respective pivot mounts 31, and an opposite end pivotally receivable in the overlapping notch pairs 104/107, 106/109, 108/111 and 110/112. The arms 96/99, as shown in FIG. 3, are 90 degrees out of phase with their actual position for the purpose of simply illustrating the structural interconnection between the transmission assembly 20 and the distortion sensing rods 96/99.

In operation of the fuel tank fire prevention system 10, the valve closure rod 48 is normally maintained in the closed position of FIG. 3 under conditions of trouble-free operation of the vehicle. The Halon extinguishant is thus confined within the container 12 and cannot flow into the fuel tank 16. However upon a predetermined distortion of the fuel tank 16, as might result from a vehicular collision or other similar extraordinary impact, the Halon extinguishant will flow into the fuel tank 16. Thus if one or more of the side walls 32, 34, 36 and 38 of the fuel tank 16 are subject to a predetermined compression impact the rotatable trigger device 40 will rotate in a counterclockwise direction as viewed in FIGS. 5 and 6 or a clockwise direction as viewed in FIGS. 2 and 8.

Figure 4:
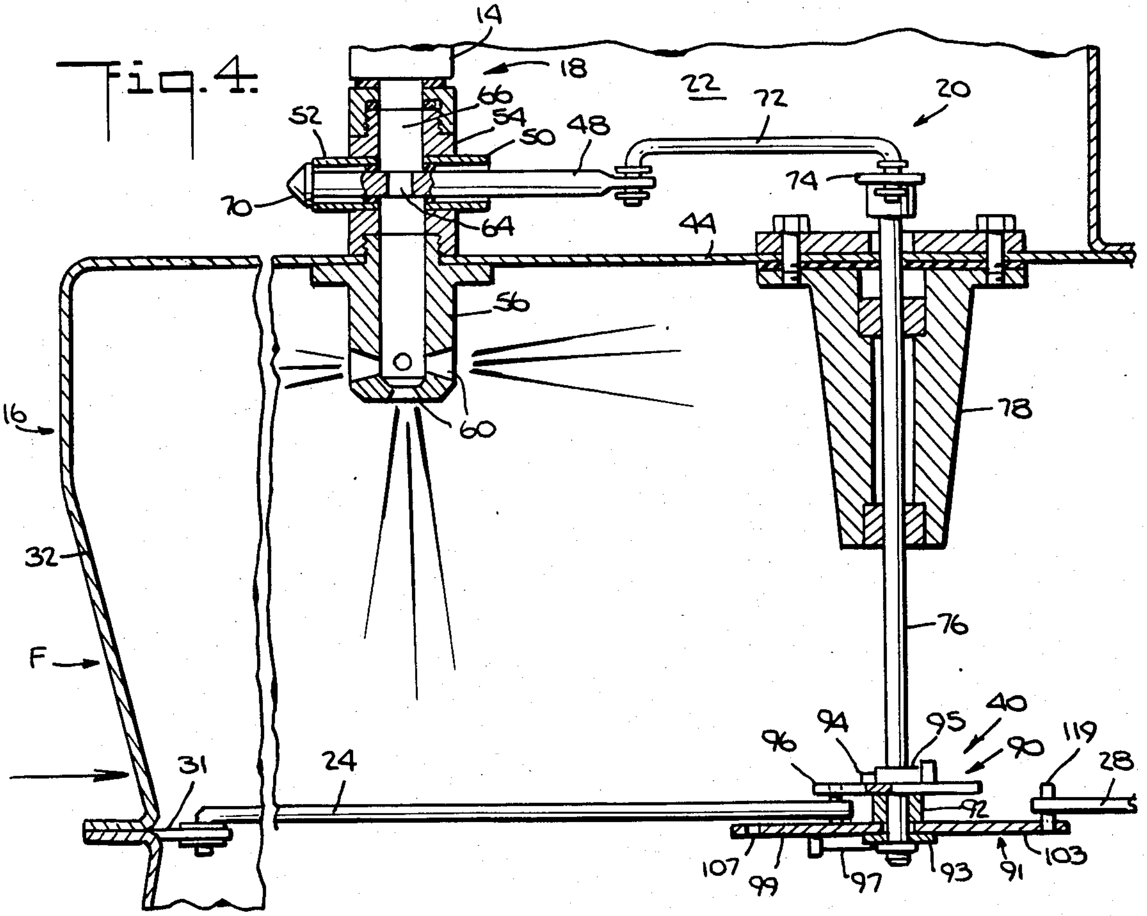
FIG. 4 is a view similar to FIG. 3 during dispensation of fire extinguishant.

For example, if the side wall 34 is sufficiently compressed by a force F as shown in FIGS. 4 and 6, the distortion sensing rod 24 will move toward the right in FIG. 4. The drive bar 115, which is engaged in the notch 107 of the arm 99, pushes against the arm 99 thereby causing the trigger wheel member 91 of the trigger device 40 to rotate in a counterclockwise direction as viewed in FIG. 6, and a clockwise direction as viewed in FIG. 8. Simultaneous or individual movement of the other distortion sensing rods 26, 28 and 30 due to compression of the side walls 34, 36 and 38 will likewise tend to rotate the trigger wheel member 91 in the direction indicated. However the trigger wheel member 91 will only rotate an amount corresponding to the greatest compressive movement of any of the distortion sensing rods 24, 26, 28 and 30.

Referring to FIG. 8, clockwise rotation of the trigger wheel member 91 will cause the pawl 97 to rotate the ratchet 93 in a clockwise direction resulting in clockwise rotation of the swivel axle 76, to which the ratchet 93 is affixed.

Referring to FIGS. 3 and 4, the described rotation of the swivel axle 76 as depicted in FIG. 6 will rotate the swivel flange 74 and shift the link 72 to the right as viewed in FIG. 3. Movement of the link 72 displaces the valve closure rod 48 to the right wherein the valve opening 64 aligns with the passageway 66. The fire extinguishant in the container 12 is thus enabled to flow through the tube 14 and the valve opening 64 for discharge through the dispensation openings 60 into the fuel tank 16. The extinguishant floats on the fuel in the tank and will eventually be drawn into the fuel lines that lead from the fuel tank 16 to prevent fire hazard beyond the fuel tank 16.

Should one or more of the sidewalls 32, 34, 36 and 38 of the fuel tank 16 become distended during a vehicular collision or extraordinary impact, the valve closure rod 48 of the valve assembly 18 will undergo similar displacement as previously described, to permit flow of extinguishant from the container 12 into the fuel tank 16.

For example, if the sidewall 34 is distended (not shown) the distortion sensing rod 24 (FIG. 7) will move a predetermined amount in a direction P in response to such distention. The drive bar 115, engaged in the notch 104 of the arm 96, will cause the trigger wheel member 90 to rotate in a clockwise direction as viewed in FIG. 7. Simultaneous or individual movement of the other distortion sensing rods 26, 28 and 30 due to distension of the sidewalls 34, 36 and 38 will likewise tend to rotate the trigger wheel member 90 in the clockwise direction as viewed in FIG. 7. However the trigger wheel member 90 will only rotate an amount corresponding to the greatest distending movement of any of the distortion sensing rods 24, 26, 28 and 30.

Referring again to FIG. 7, the clockwise rotation of the trigger wheel member 90 will cause the pawl 95 to rotate the ratchet 94 in a clockwise direction resulting in clockwise rotation of the swivel axle 76 (as viewed in FIG. 7) to which the ratchet 94 is affixed.

Referring to FIG. 3, the described rotation of the swivel axle 76 as depicted in FIG. 7 will rotate the swivel flange 74 in a direction opposite to that which is depicted in FIG. 4. However such rotation will nevertheless tend to shift the link 72 to the right as viewed in FIG. 3, thereby displacing the valve closure rod 48 to the right, to align the valve opening 64 with the passageway 66. Fire extinguishant from the container 12 is thus enabled to flow through the tube 14, the valve opening 64 and the dispensation openings 60 into the fuel tank 16.

While the pawl and ratchet drive arrangements 97/93 and 95/94 rotate the swivel axle 76 in opposite directions other drive arrangements can be provided which will rotate the swivel axle 76 in one direction if desired, despite opposite rotation of the trigger wheel members 90 and 91 for compressive and distended conditions of the fuel tank sidewalls 32, 34, 36 and 38. For example, the pawl 95 can be replaced by a gear (not shown) fixed to the trigger wheel member 90, and the ratchet 94 can be replaced by a gear (not shown) affixed to the swivel axle 76, both gears being in mutual engagement during rotation of the trigger wheel member 90, to accomplish rotation of the swivel axle 76.

Similar gear replacements (not shown) can be made for the pawl 97 and the ratchet 93, on the trigger wheel member 91. However an idler gear (not shown) would also be included between the two gears just referred to, in order to accomplish unidirectional rotation of the swivel axle 76 despite opposite directional rotation of the trigger wheel members 90 and 91.

Figures 22, 23, 24:
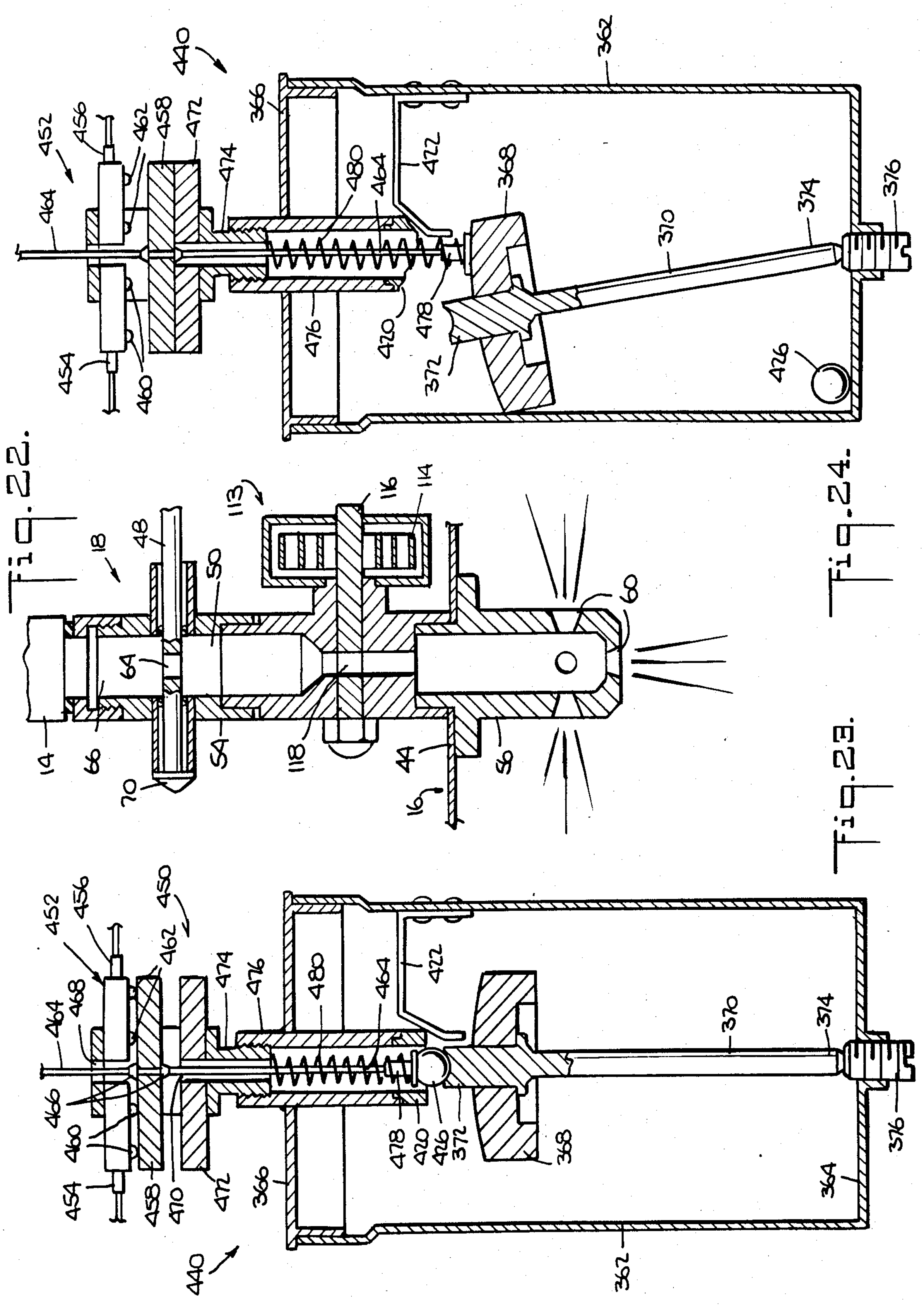
FIG. 22 shows a thermal actuated valve incorporated in the system of FIG. 3.
FIG. 23 is a further embodiment of the flow control device with the weight member in a set position.
FIG. 24 is a view similar to FIG. 23 with the weight member disposed in an out-of-set position.

In another embodiment of the invention as shown in FIG. 22, a thermal actuated valve 113 is included in the valve assembly 18. The thermal actuated valve 113, which is disposed between the valve neck 54 and the dispensation member 56, includes a bimetallic spring 114 connected to a valve rod 116 having a valve opening 118. Under normal conditions, the valve opening 118 of the rod 116 is rotated out of alignment with the passageway 66 to close off the passageway 66. If a fire should develop near the fuel tank 16 following a vehicular collision the bimetallic spring 114 causes the valve rod 116 to rotate and align the valve opening 118 with the passageway 50.

In accordance with the description of the embodiments of FIGS. 1–4 the valve opening 64 has aligned with the passageway 66 immediately following the collision. Thus the embodiment of FIG. 22 will dispense extinguishant only when a collision is accompanied by a fire in proximity of the fuel tank. Consequently the thermal valve 113 serves as an additional safety valve to prevent dispensation of fire extinguishant in the fuel tank 16 under conditions where an impact is not likely to cause a fire. Accordingly, the thermal valve 113 permits resetting of the valve closure rod 48 in the valve assembly 18 without the discharge of fire extinguishant material into the fuel tank 16.

Figure 9:
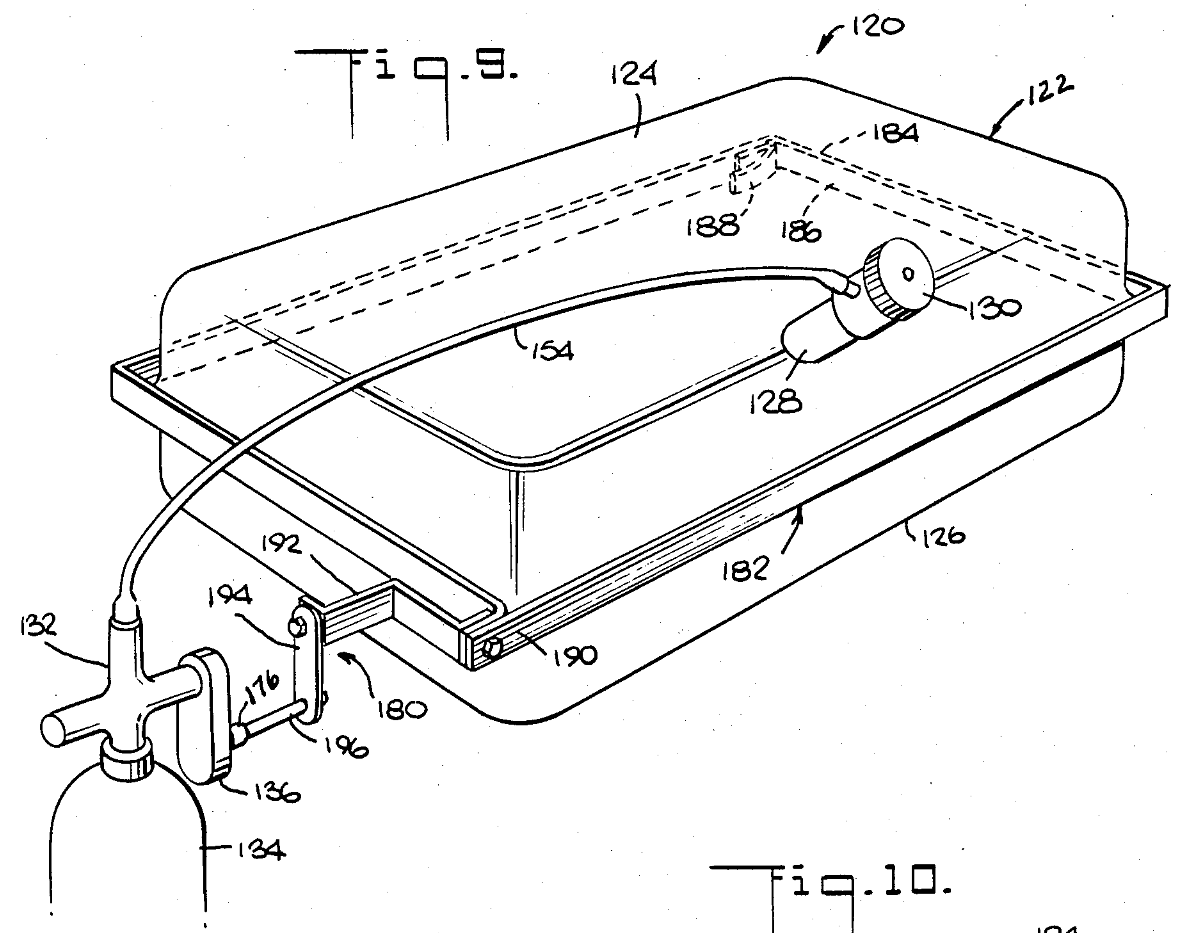
FIG. 9 is a perspective view of another embodiment of the fuel tank fire prevention system.

Another embodiment of the fuel tank fire prevention system is generally indicated by the reference number 120 in FIG. 9. The system 120 includes a fuel tank 122 of any suitable known clam shell construction having an upper shell portion 124 engaged on a lower shell portion 126. The upper shell portion 124 is provided with a fuel inlet pipe 128 and a fuel cap 130.

The system 120 further includes a valve assembly 132 supported on a container 134 containing a fire extinguishant such as Halon. A transmission assembly 136 is supported by the valve assembly 132.

Figure 11:
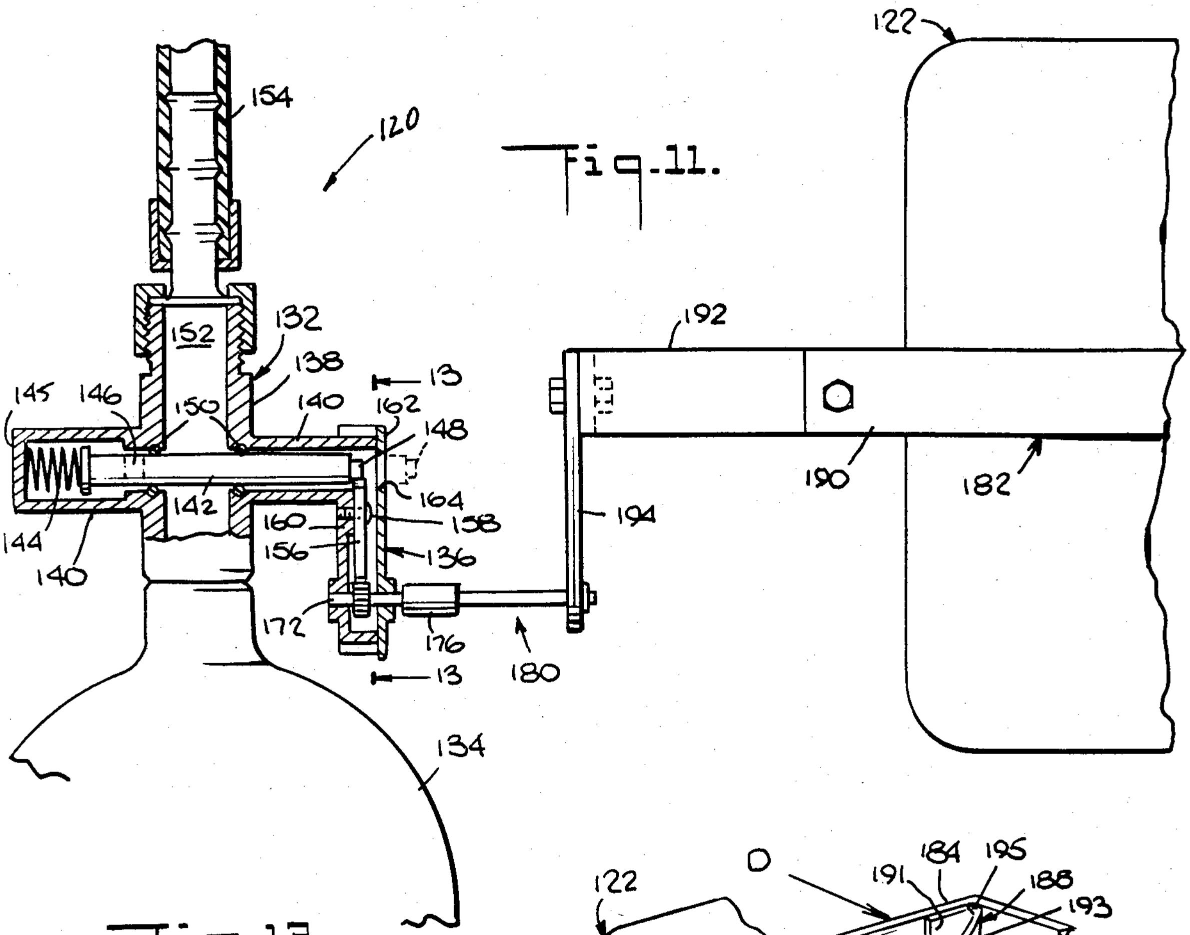
FIGS. 11 and 12 are enlarged fragmentary views thereof, partly shown in section.

Referring to FIG. 11, the valve assembly 132 includes a neck 138 that communicates with a transverse sleeve 140 which crosses the neck 138. A valve closure rod 142 is slidably disposed in the transverse sleeve 140. A compression spring 144 is provided between one end of the rod 142 and a closed end 145 of the transverse sleeve 140. The valve closure rod 142 also includes a valve opening 146 and a reduced end portion 148.

A pair of O-rings 150 in the transverse sleeve 140 provide a leak-tight seal around the valve closure rod 142. The valve closure rod 142 normally blocks a fluid passageway 152 in the neck 138 to prevent flow of fire extinguishant from the container 134 through a tube 154 to the fuel tank 122.

The transmission assembly 136 comprises a cam 156 pivoted at 158 to a cam housing 160 provided at the reduced end portion 148 of the valve closure rod 142. A detachable plate member 162 of the cam housing 160 includes an opening 164 aligned with the valve closure rod 142 as shown most clearly in FIG. 11.

The cam 156 has a tooth 166 engaged with the valve closure rod 142 at the reduced end portion 148 to maintain the rod 142 in a retracted position wherein the valve opening 140 is out of alignment with the passageway 152 in the neck 138. An opposite end of the cam 156 is provided with a series of teeth 168 engaged with a gear 170 fixed to a shaft 172. The shaft 172 is rotatably mounted in the cam housing 160 and joined outside of the housing 160 by a coupling 176 for connection to a distortion sensing assembly 180.

Figure 10:
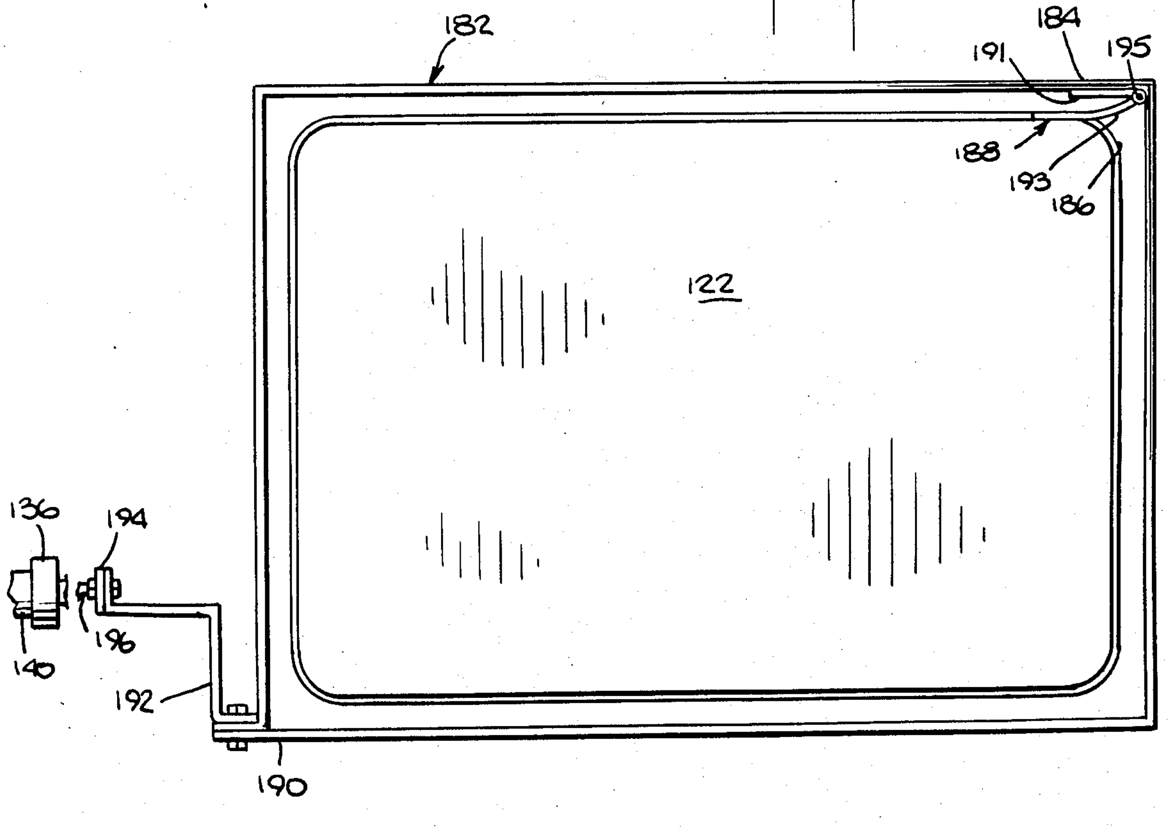
FIG. 10 is a plan view thereof.

The distortion sensing assembly 180 includes a generally rectangular deflection member 182 surrounding and spaced from the periphery of the fuel tank 122 as most clearly shown in FIG. 10. A corner portion 184 of the deflection member 182 is joined to a corresponding corner portion 186 of the fuel tank 122 by a bracket 188. The bracket 188 is preferably bonded or welded to the corner portion 184 but releasably secured in any suitable known fashion to the corner portion 186. The bracket 188 can be formed in one piece, or in two pieces 189 and 191 that are joined by a pivot spring 193.

A diagonally opposite corner portion 190 of the deflection member 182 is fixed to one end of a right angle junction member 192. Another end of the junction member 192 is fixed to one end of a link 194. An opposite end of the link 194 is keyed to a shaft 196 that joins the coupling 176. The shaft 196 is thus a continuation of the shaft 172.

Figure 12:
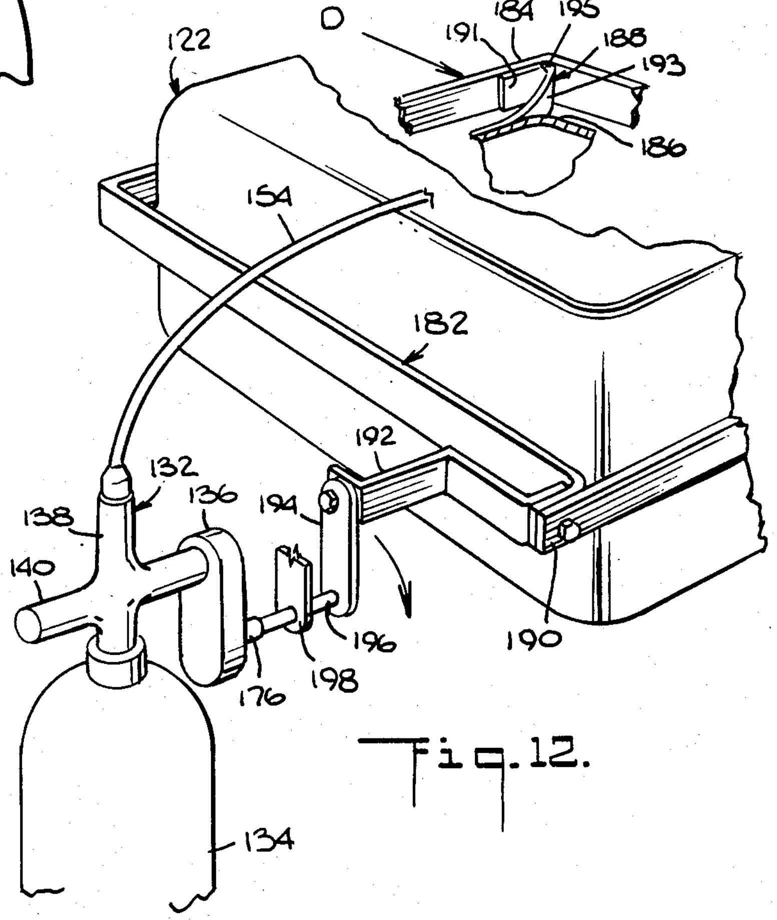

A support bar 198 which, for purposes of clarity, is shown only in FIG. 12, freely accommodates the shaft 196 and is connected in any suitable known fashion to the frame (not shown) of a vehicle (not shown) which carries the fuel tank 122.

In operation of the fuel tank fire prevention system 120, the valve closure rod 142 is normally maintained in the closed position of FIG. 11, under conditions of trouble-free operation of the vehicle containing the fuel tank 122. The Halon extinguishant is thus confined within the container 134 and cannot flow into the fuel tank 122. When the fuel tank 122 is impacted a predetermined amount, such as might occur in a vehicular collision, the valve closure rod 142 will shift and fire extinguishant will flow into the fuel tank 122.

When a vehicular impact of predetermined magnitude occurs, the deflection member 182 will shift its position about the corner portion 186 of the fuel tank 122 due to deflection of the bracket 188. The deflection bracket 188 is structured to deflect a predetermined amount when a predetermined threshhold level of impact occurs to the vehicle carrying the fuel tank 122.

Figure 13:
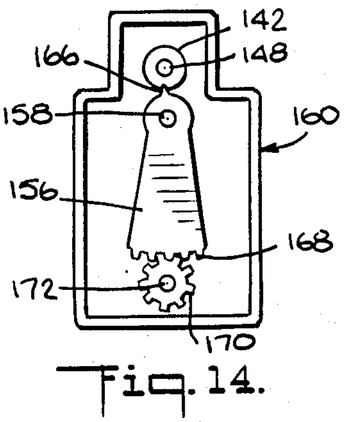
FIG. 13 is a sectional view taken on the line 13—13 of FIG. 11.
Figure 14:
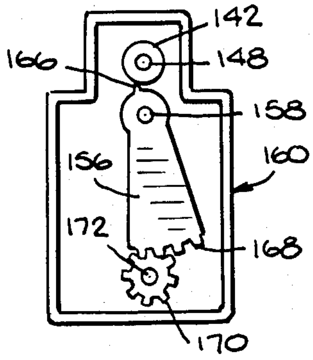
FIG. 14 is another operational view of FIG. 13.

For example an impact in the direction D shown in FIG. 12 will cause the deflection member 182 to shift in a manner which causes the link 194 to pivot in a clockwise direction. Clockwise movement of the link 194 rotates the shaft 196, the coupling 176 and the shaft 172 which carries the gear 170. A predetermined movement of the gear 170 in either a clockwise or counterclockwise direction will rotate the cam 156 the required amount necessary to clear the cam tooth 166 from the reduced end portion 148 of the valve closure rod 142 as shown in FIGS. 13 and 14.

Once the valve closure rod 142 is no longer obstructed by the cam tooth 166 the spring 144 (FIG. 11) in the transverse collar 140 can expand and shift the valve closure rod 142 toward the right as shown in dotted outline. The opening 164 in the cam housing 160 can be sized to accommodate the valve closure rod 142 as shown or can be sized to interfere with the valve closure rod, thereby stopping movement of the rod 142 when the reduced end portion 148 engages the opening 164. In either case the valve opening 146 will align with the passageway 152 of the valve neck 138 to permit flow of extinguishant from the tank 134 into the tube 154 for entry in the fuel inlet pipe 128 and dispensation in the fuel tank 122.

Since the clockwise or counterclockwise rotation of the gear 170 will free the cam tooth 166 from the reduced end portion 148 of the valve closure rod 142, an impact force in a direction opposite the direction D will accomplish the same shifting of the valve closure rod 142. Furthermore, impact in a direction perpendicular to the direction D of FIG. 12 will likewise cause the deflection member 182 to pivot about the pivot 195 and accomplish the same shifting of the valve closure rod 142 as previously described.

It should be noted that the system 120 can absorb inconsequential deflections of the deflection member 182 without causing a shift of the valve closure rod 142 by requiring a predetermined amount of rotation of the gear 170 before the cam tooth 166 clears the reduced end 148 of the valve closure rod 142.

Since many dangerous life-threatening impacts to a vehicle may not cause a distortion of the fuel tank 122 there is no requirement that the fuel tank 122 be distorted in order for the system 120 to function. The system 120 can also be rendered compatible with the system 10 if it is desired to incorporate both systems in a fuel tank.

Figure 15:
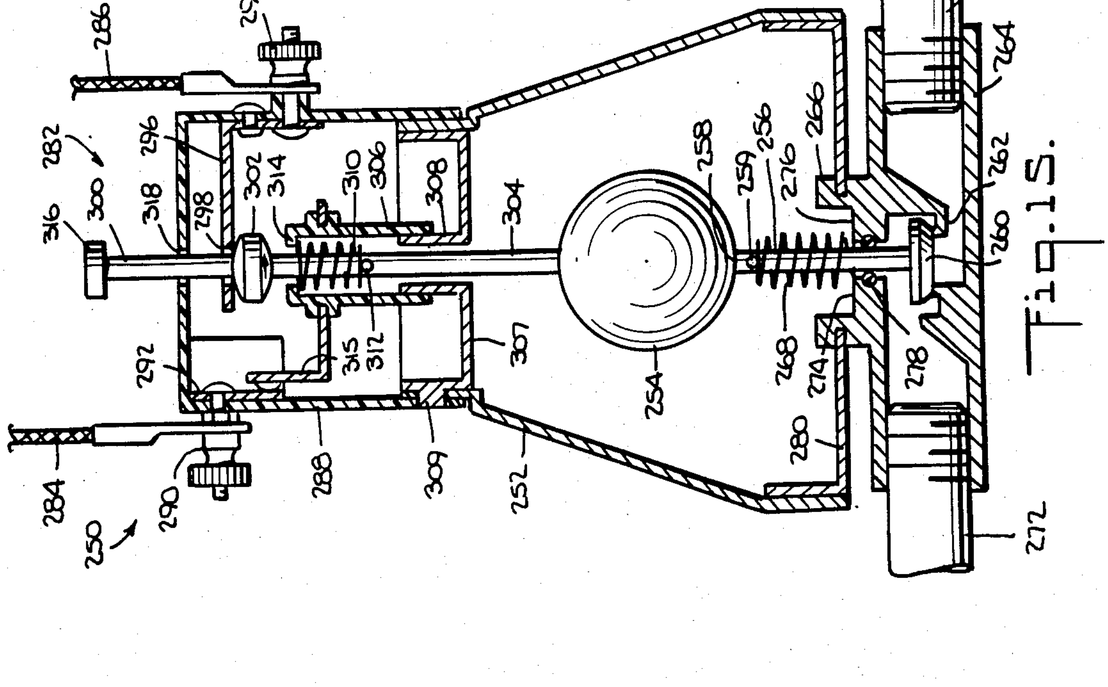
FIG. 15 is a sectional view of a flow control device incorporating the present invention with a spacer member disposed in a set position.

The circumbendibus safety system further comprises flow control means generally indicated by the reference number 250 in FIG. 15 for controlling the flow of fire extinguishant to a desired location such as a fuel tank and for controlling the flow of electricity to a vehicular ignition system.

The flow control means 250 includes a receptacle 252 containing a spherical weight 254 made of a high density material such as Zamak sold by Eastern Alloys, Inc. of Maybrook, N.Y. The weight 254 is supported on a valve member 256 at a seating portion 258 provided at one end of the valve member 256. A valve head 260, provided at the opposite end of the valve member 256, is normally in engagement with a valve seat 262 formed in a pipe 264 connected to the receptacle 252 at a neck portion 266. The pipe 264 is detachably secured to the receptacle 252 at the neck portion 266 in any suitable known fashion, as by threads provided in the neck portion 266.

A biasing spring 268 disposed between a stop pin 259 and the neck portion 266 biases the valve head 260 away from the valve seat 262. The valve head 260 normally engages the valve seat 262 when the weight 254 is disposed on the seating portion 258. The valve head 260 thus prevents flow of fire extinguishant from a container 269 (FIG. 17) through an inlet tube 270 joined to the pipe 264 into an outlet tube 272 joined to an opposite end of the pipe 264 and connected to a fuel tank 273. A bearing collar 274 provided in a wall portion 276 of the pipe 264 permits slidable movement of the valve member 256 with respect to the pipe member 264. An O-ring 278 provides a leak-tight seal between the valve member 256 and the bearing collar 274. A base portion 280 of the receptacle 252 can be detachably secured to the receptacle 252 in any suitable known fashion as by threaded engagement.

The flow control means 250 also includes means 282 for shutting off the flow of electricity to the ignition system of the vehicle. The electrical shut off means 282 are provided between cables 284 and 286 that are connected to a cup-like member 288 formed of nonconductive material. The cup-like member 288 is detachably secured to the receptacle 252 in any suitable known manner.

A terminal nut 290 which secures the cable 284 to the cup-like member 288 also affixes a conductive strip 292 to the interior of the cup-like member 288. A second terminal nut 294, which secures the cable 286 to the cup-like member 288 also affixes a conductive strip 296 to the interior of the cup-like member 288. The conductive strip 296, which is L-shaped, extends toward the terminal 290 and is provided with an opening 298 for reception of a plunger 300 formed of conductive material and having a disc-shaped contact portion 302 normally in engagement with the conductive strip 296.

The plunger 300 includes a stem portion 304 surrounded by a conductive collar 306 that is threaded or otherwise secured to a detachable end portion 307 of the receptacle 252 at a neck portion 308. The end portion 307 can be detachably secured to the receptacle 252 in any suitable known manner as by a bayonet fastener schematically indicated at 309. A biasing spring 310, disposed between a conductive pin 312 on the stem portion 304 in a flanged end 314 of the conductive collar 306 biases the stem 304 against the weight 254.

A conductive junction strip 315 is in conductive engagement with the conductive strip 292 and the conductive collar 306. An insulated reset button 316 is provided at a free end of the plunger 300. An opening 318 provided in the cup-like member 288 permits relative movement between the plunger 300 and the cup-like member 288.

In operation of the flow control means 250 the weight 254 is normally positioned between the seating portion 258 and the stem portion 304. The size and weight of the weight 254 can be selected to resist movement away from its seated position for impacts having an energy level up to approximately 1700 foot pounds. For example in a vehicle weighing approximately 2750 pounds that is subject to an impact reaching an energy level of 1700 foot pounds, the weight 254 will unseat from the seating portion 258 falling to the base portion 280 of the receptacle 252. The biasing springs 310 and 268 are thus free to expand. Consequently, the valve member 256 is urged into the open position of FIG. 16 enabling the fire extinguishant to flow from the inlet tube 270 through a valve opening 320 at the valve seat 262 into the outlet tube 272.

Figure 16:
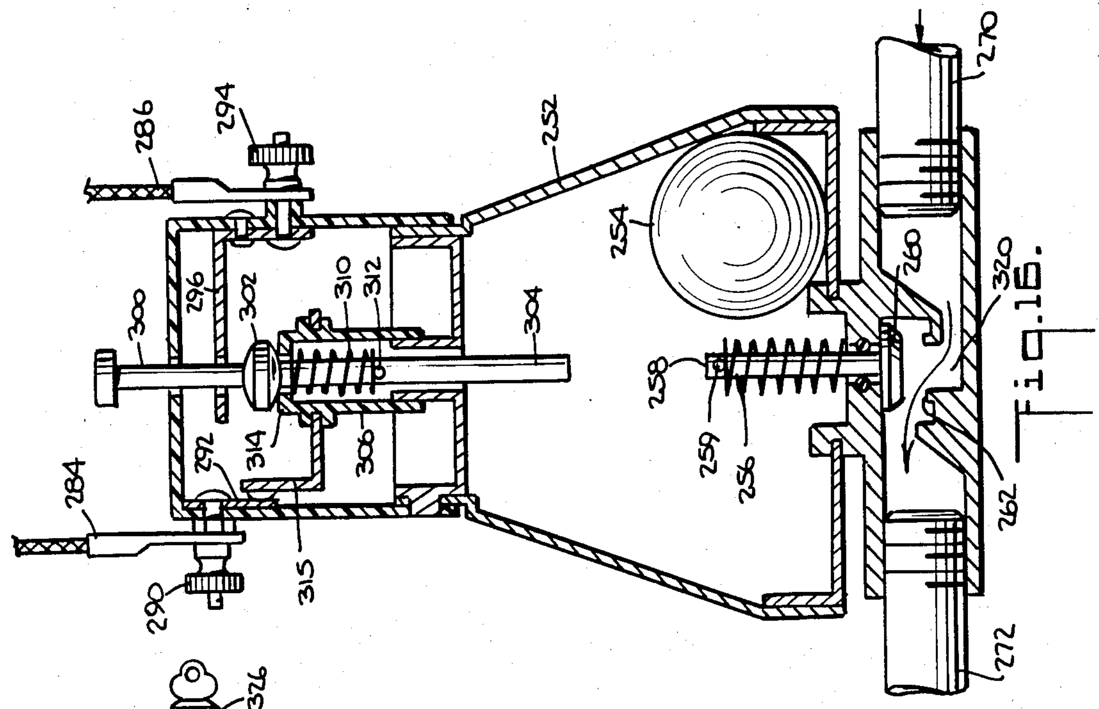
FIG. 16 is a view similar to FIG. 15 showing the spacer member in an out-of-set position.

The spring 310, which urges the valve stem 304 downwardly as viewed in FIG. 16, provides a path of conduction between the flanged end 314 of the collar 306 and the pin 312. Although the conduction path normally continues through the contact portion 302 into the conductive strip 296 and to the cable 286 as shown in FIG.15, such path is broken when the contact portion 302 is urged away from the conductive strip 296 as shown in FIG. 16 thereby breaking the circuit between the cables 284 and 286. Accordingly, as shown schematically in FIG. 17 the connection between an alternator 322 and a distributor 324 is broken when the flow control means 250 is in the position of FIG. 16. If desired, a bypass such as a key operated switch 326 can be provided in the electrical circuit of FIG. 17 to restore power to the distributor until the flow control means 250 is reset to the FIG. 15 position. However, it may be desirable to limit operation of the key switch 326 to the police to prevent a vehicle involved in such a collision from leaving the scene of an accident.

Figure 18:
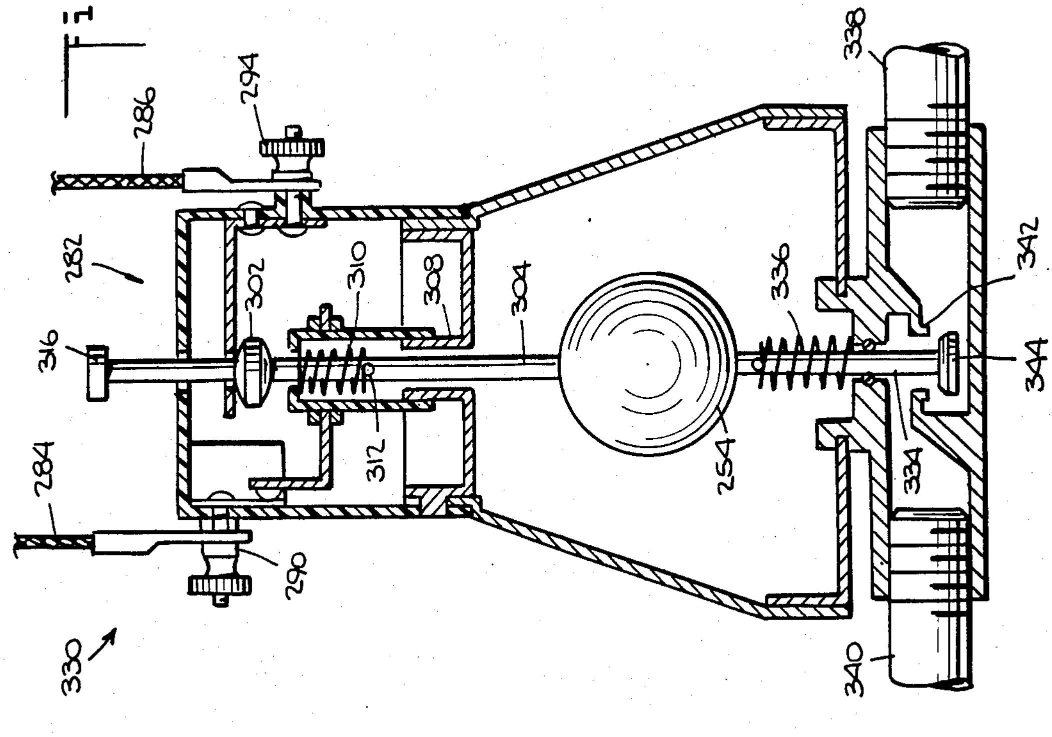

Another embodiment of the flow control means indicated by reference number 330 in FIG. 18 employs the electrical shut-off means 282 of the FIG.15 embodiment and substitutes a normally open fluid valve member 334 for the normally closed fluid valve member 256 of the FIG. 15 embodiment. The valve member 334 is maintained in an open position when the spherical weight 254 is in its seated position. A biasing spring 336 biases the valve 334 into a closed position when the spherical weight 254 is unseated. The embodiment of FIG. 18 can thus be used as a shut-off control for the fuel flow as compared with the turn-on control of FIG. 15 for permitting flow of fire extinguishant. Accordingly, when the vehicle is in trouble free operation, fuel will flow from an inlet tube 338 to an outlet tube 340 through a valve opening 342. In the event of a collision or impact of predetermined level, the spherical weight 254 will unseat enabling the biasing spring 336 to move the valve 334 into a closed position by engagement of a valve head 344 in the valve opening 342.

Figure 19:
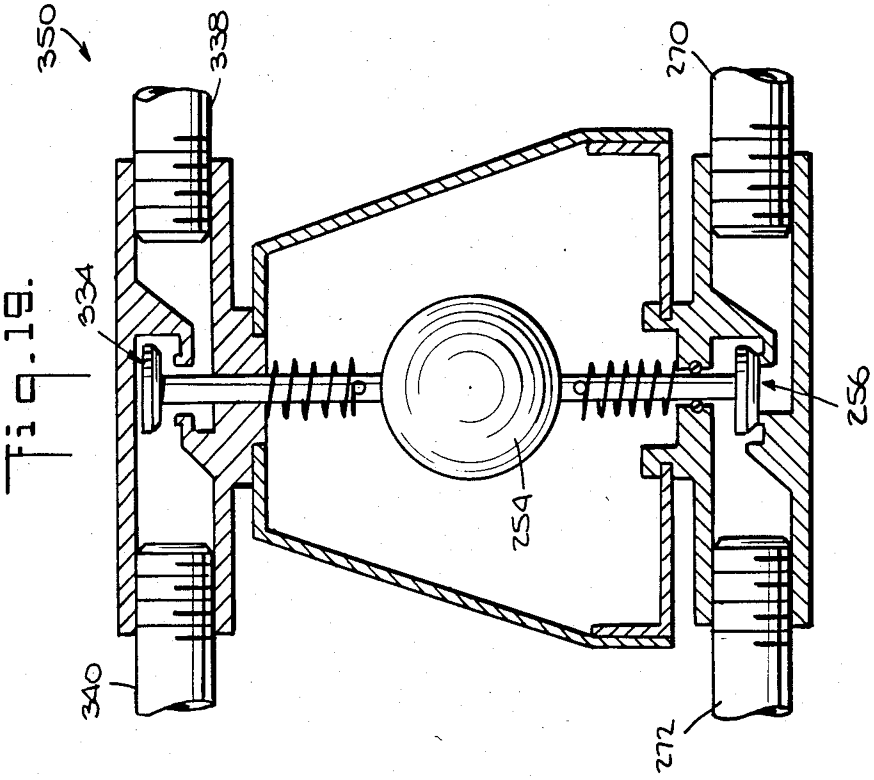
FIGS. 18 and 19 show further embodiments of a flow control device.

A further embodiment of the flow control means indicated by the reference number 350 in FIG. 19 employs the normally open fluid valve member 334 of FIG. 18, and the normally closed fluid valve member 256 of FIG. 15 operable with the spherical weight 254 to maintain the positions of the normally closed valve 256 and the normally open valve 334. When the spherical weight 254 is unseated following a predetermined impact, the normally closed valve 256 opens to permit fire extinguishant to flow from the inlet tube 270 to the outlet tube 272, and the normally open valve 334 closes to prevent the flow of fuel from the inlet tube 338 to the outlet tube 340.

In a still further embodiment of the flow control means (not shown) a single valve having two valve heads can replace the valve arrangement of FIG. 15. One of the valve heads is normally closed (similar to the valve 256 of FIG. 15) and the other valve head normally open (similar to the valve 334 of FIG. 18) when the weight 254 of FIG. 15 is seated. After a predetermined impact causing the weight to unseat, the normally closed valve opens to admit fire extinguishant for example, and the normally open valve closes to shut off the flow of fuel, for example. The electrical shutoff means, identical to 282 of FIG. 15 also operates as previously described when the weight 254 is unseated. Thus the flow control means of this embodiment operates three functions when it shuts off the electricity in the ignition system, shuts off the flow of fuel and permits the flow of fire extinguishant.

Figure 20:
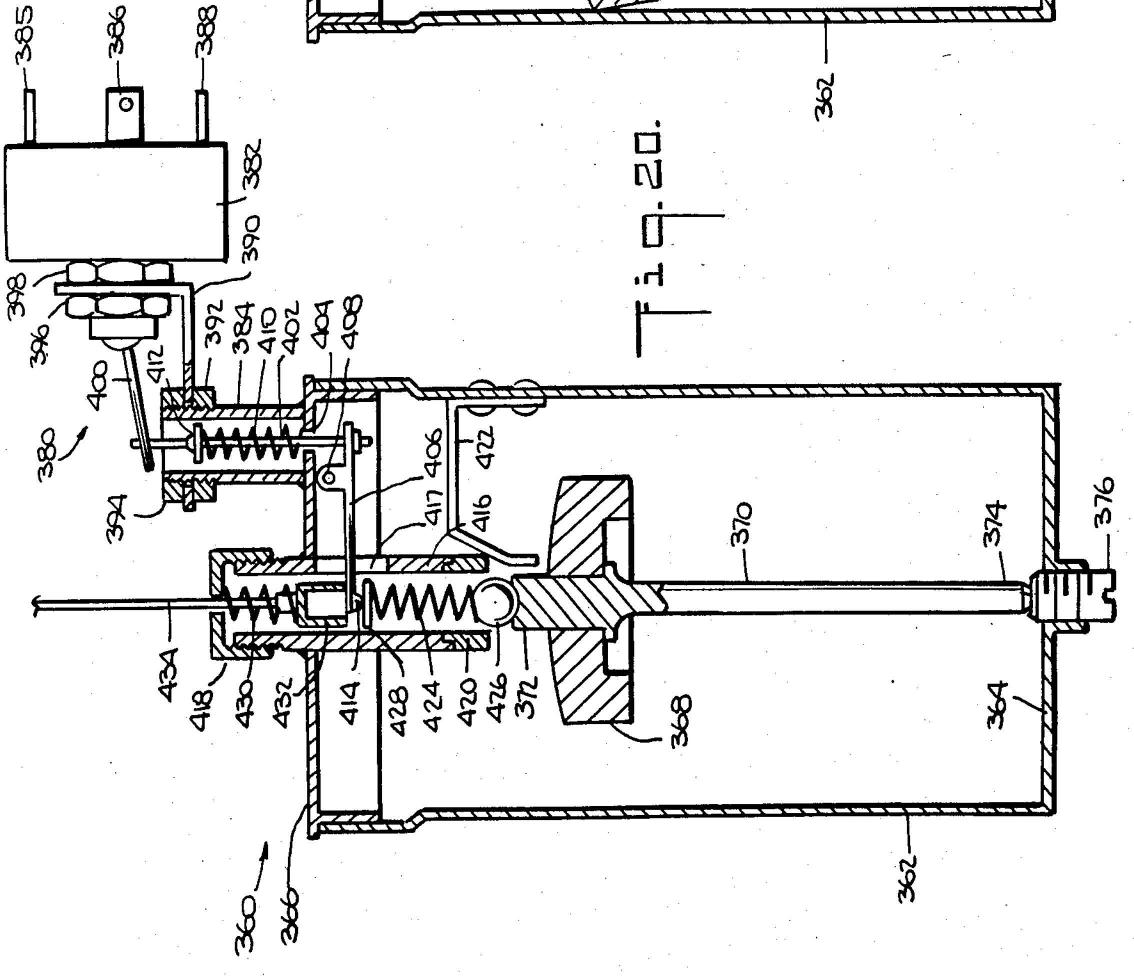
FIG. 20 is another embodiment of a flow control device with a weight member disposed in a set position.

Another embodiment of the flow control means is generally indicated by the reference number 360 in FIG. 20. The flow control means 360 comprises a receptacle 362 having a base portion 364 at one end and a detachable cover 366 at an opposite end. A generally disc shaped weight 368 is secured to a rod 370 as by threading, welding or other suitable means of affixation. The rod 370 has one end 372 projecting above the weight 368 and an opposite tapered end 374 engaging a height adjustment screw 376 threaded into the base portion 364.

An electrical shutoff means 380 provided in the receptacle 362 includes a single pole single throw switch 382 such as a Lever-Lite switch number 26F832 manufactured by Switchcraft, Inc. of New Jersey. The switch 382 has connection terminals 385, 386 and 388 which for example, connect to the electrical system of a vehicle such as an automobile. The switch 382 is supported on a sleeve 384 by a support bracket 390 held by lock nuts 39Z, 394 and 396, 398.

A switch arm 400 of the switch 382 extends over a free end of the sleeve 384 for engagement with a push rod 402 that is axially moveable in the sleeve 384. The push rod 402 extends through an opening 404 in the cover 366 for connection with a lever 406 pivoted at 408 to the cover 366. A biasing spring 410 is disposed in the sleeve 384 between the cover 366 and a disc 412 fixed to the push rod 402. A free end 414 of the lever 406 extends into a sleeve 416 through an opening 417.

The sleeve 416, which is affixed in any suitable known manner to the cover 366, has a cap 418 threaded to one end thereof and an annular fusible portion 420 affixed to an opposite end thereof and formed of a known alloy commonly used in fusible links which softens or loses its structural integrity at approximately 160° F. A biasing leaf spring 422 affixed to the receptacle 362 engages the fusible portion 420.

The rod 370 is maintained in an upright position in the receptacle 378 by the biasing force of a spring 424 having one end bearing against a wall 426 seated at the end portion 372 of the rod 370. An opposite end of the spring 424 is provided with a disc 428 that pushes upwardly on the free end 414 of the lever 406. The force of the spring 424 and the disc 428 is neutralized by a spring 430 disposed between the cap 418 and a bell piece 432 that pushes downwardly on the free end 414 of the lever 406. Although not shown, a small notch is formed in the bell piece 432 to locate the free end 414 of the lever 406. An actuator cable 434, which is surrounded by the spring 430, has one end secured to the bell piece 432.

Figure 17:
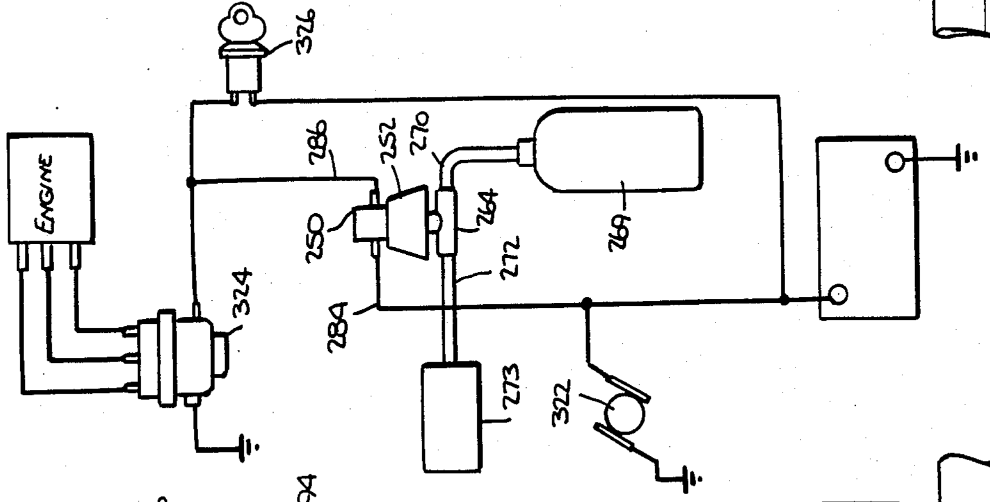
FIG. 17 is a simplified schematic circuit diagram of an ignition circuit incorporating the present invention.

In operation of the flow control means 360, the switch 382 is connected to the electrical system of a vehicle, for example as a replacement of the system 250 in FIG. 17, and the opposite end (not shown) of the actuator cable 434 is connected to a valve closure rod such as the rod 48 of the valve assembly 18 of FIG. 3 to replace the actuator link 72 and thereby represent another embodiment of the invention.

Preferably the receptacle 362 is located in an area of the vehicle where normal temperatures do not approach 160° F. Thus when the receptacle 362 is subject to an unusually high temperature condition, such as might be due to a fire in the vehicle, the fusible portion 420 will lose its structural integrity and yield to the biasing force of the spring 422 which pushes the end 372 of the rod 370 out of alignment with the sleeve 416.

Figure 21:
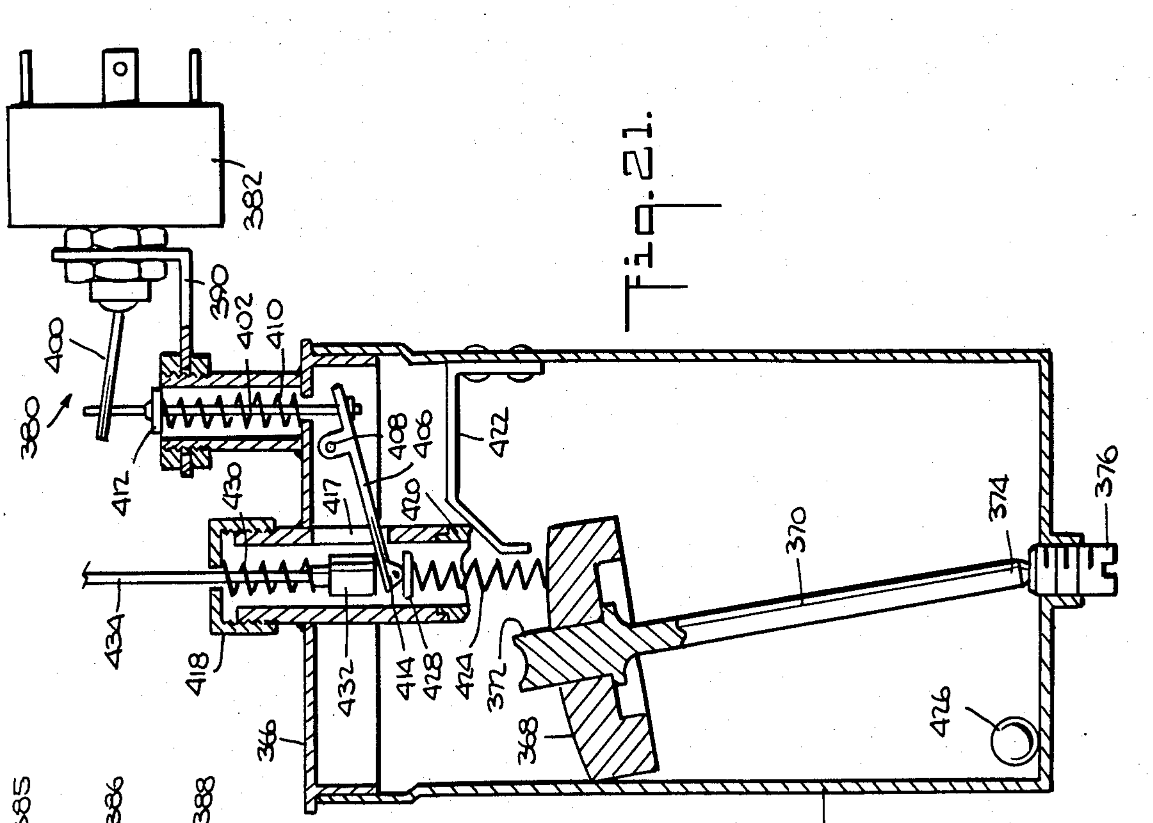
FIG. 21 is a view similar to FIG. 20 with the weight member disposed in an out-of-set position.

Consequently the biasing force of the spring 424 is relaxed enabling the spring 430 to urge the bell piece 432 downwardly against the end portion 414 of the lever 406 as shown in FIG. 21. The lever 406 thus pushes the push rod 402 upwardly in the sleeve 384 to move the switch arm 400 which shifts the switch 382 from the closed position, for example, to an open position thereby cutting off the flow of electricity to the distributor.

In addition, the downward movement of the bell piece 432 exerts a pull on the cable 434 that is sufficient to move the valve closure rod 48 to align the valve opening 64 with the passageway 66 and permit dispensation of fire extinguishant into the fuel tank or any other selected location.

The flow control means 360 also will operate under conditions of predetermined impact to cause movement of the weight 368 and the rod 370 out of alignment with the sleeve 416. Thus movement of the switch 382 and movement of the cable 434 ar actuatable under predetermined impact conditions as well as predetermined temperature conditions to accomplish the functions previously described.

Another embodiment of the flow control means is generally indicated by the reference number 440 in FIG. 23. A primary difference between the flow control means 440 and the flow control means 360 of FIG. 20 is in the provision of an electrical shutoff means 450 instead of the electrical shutoff means 380. The electrical shutoff means 450 includes a known push-on/pull-off disc switch 452 such as Littel Switch No. 22F208 manufactured by Switchcraft of New Jersey. The disc switch 452 is normally closed in the FIG. 23 position Therefore conduction is established between connection terminals 454 and 456 through a moveable conduction disc 458 that has a contact position engaging contacts 460 of the terminal 454 and contacts 462 of the terminal 456.

A cable 464 is secured to the disc 458 in any suitable manner as by nodules 466 at opposite sides of the disc 458. The cable 464 passes through an opening 468 in the switch 450 for connection to a valve closure rod such as the rod 48 of the valve assembly of FIG. 3 to replace the actuator link 72 and thereby represent another embodiment of the invention. The cable 464 also passes through an opening 470 in a stop piece 472 spaced from the conduction disc 458. The stop piece 472 is supported on a hollow neck 474 threaded into one end of a sleeve 476 affixed to the cover 360 of the receptacle 362 previously described in the FIG. 20 embodiment.

A bearing member 478 affixed to an end of the cable 464 inside the receptacle 362 bears against the ball 426 under the influence of a spring 480 disposed in the sleeve 476 between the bearing member 478 and the neck portion 474.

The operation of the flow control means 440 is initiated by either the temperature conditions or the impact conditions previously described for the FIG. 20 embodiment which cause the ball 426 to unseat from the end 372 of the rod 370. Thus the weight 368 and the rod 370 move out of alignment with the sleeve 476, enabling the spring 480 to expand. The expanding spring 480 forces the cable downwardly as viewed in FIG. 24, which cable movement can be translated to movement of the valve closure rod 48 of the FIG. 3 embodiment in a manner previously described to accomplish the fire extinguishing flow function.

Downward movement of the cable 464 also causes the conduction disc 458 to separate from the contacts 460 and 462 and move against the stop piece 472 to open the circuit between the terminals 454 and 456. This open circuit function can be used for example to cut off the flow of electricity to the distributor.

Figures 25, 26, 27:
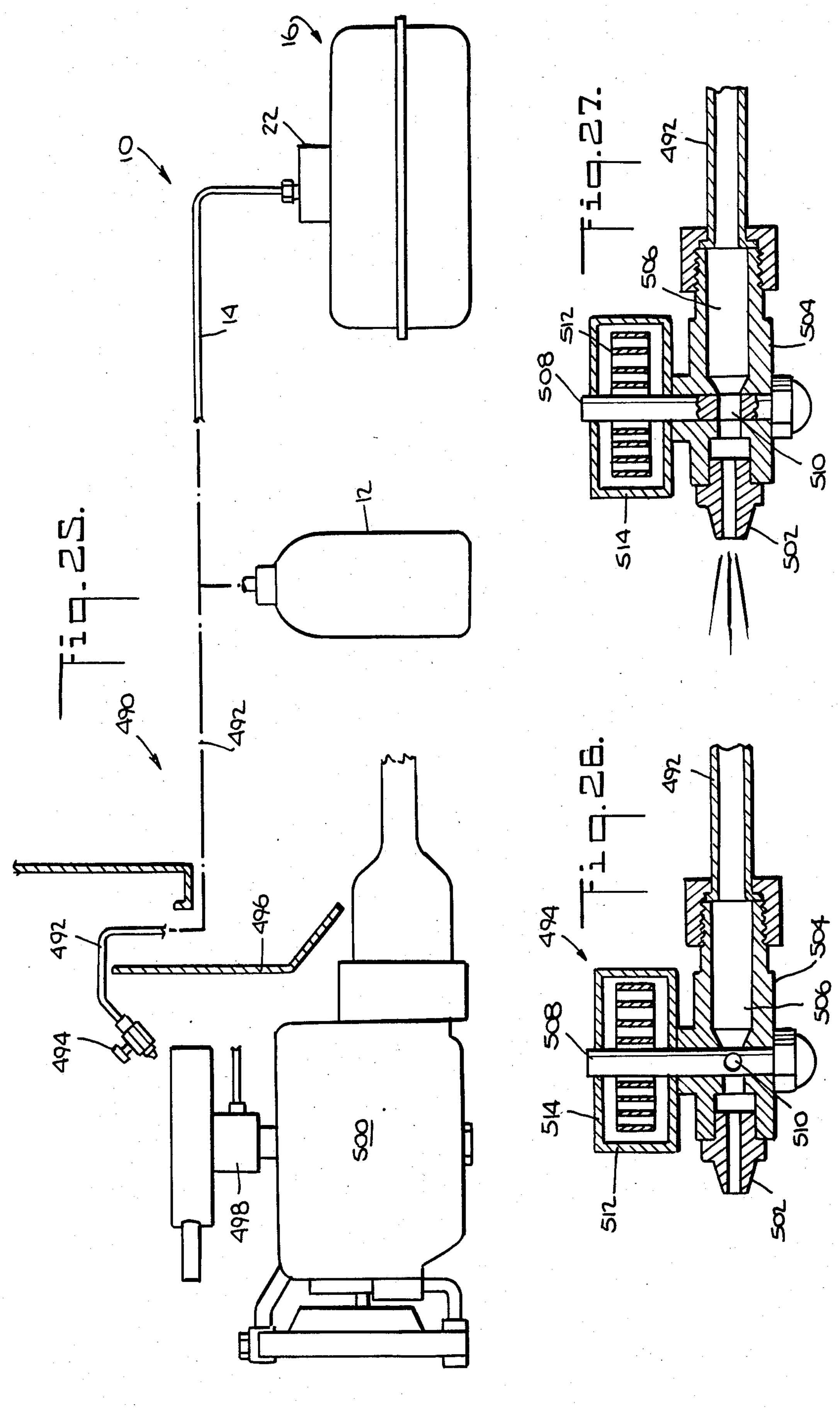
FIG. 25 shows a combination fuel tank and engine compartment fire prevention system.
FIGS. 26 and 27 show a thermal actuated valve incorporated in the system of FIG. 25; and, FIG. 28 shows a further embodiment of a flow control device.

An engine compartment fire prevention system is generally indicated by the reference 490 in FIG. 25. The system 490 includes the container 12 of extinguishant that flows through a tube 492 to a thermal actuated valve 494 supported in any suitable known manner beyond a fire wall 496 of a vehicle, in the vicinity of a carburetor 498 and an engine 500.

The valve 494 includes a nozzle 502 at one end of a valve body 504 that is communicable with the tube 492 through a passageway 506 in the valve body 504. A valve rod 508 is rotatably mounted in the valve body 504 across the passageway 506. The valve rod 508 includes a valve opening 510 that is normally out of alignment with the passageway 506 enabling the valve rod 508 to block communication between the tube 492 and the nozzle 502. A bimetallic spring 512 provided in a housing 514 on the valve body 506 connects to an end portion of the valve rod 508.

It is well known that temperatures in the engine compartment of a vehicle operating under normal conditions vary according to the distance from the engine 500. Thus when the valve 494 is at a given distance from the engine as schematically shown in FIG. 25, the bimetallic spring 512 will maintain the valve rod 508 in a predetermined position wherein the valve opening 510 is out of alignment with the passageway 506. The spring 512 is selected to react to a predetermined abnormally high temperature level in the engine compartment at the location of the valve 494, which temperature condition, for example, might occur as a result of a fire in the engine compartment.

The spring 512 will thus expand in a known manner thereby causing the rod 508 to rotate to a predetermined position wherein the valve opening 510 aligns with the passageway 506 to permit extinguishant to flow from the tube 492 through the valve opening 510 and outwardly of the nozzle 502 onto an area around the carburetor where a fire is likely to occur. When the fire is extinguished and temperatures in the engine compartment subside, the spring 512 will cause the valve rod 508 to rotate to the normally closed position of the valve opening 510 shutting off the flow of extinguishant through the nozzle 502.

If desired the engine compartment fire prevention system 490 can be combined with the fuel tank fire prevention system 10 as shown schematically in FIG. 25. Also if desired, the thermal activated valve system of FIG. 26 can be employed on a fuel line to automatically shut off the flow of fuel to the engine when the temperature around the thermal actuated valve reaches a predetermined level caused by a fire.

Figure 28:
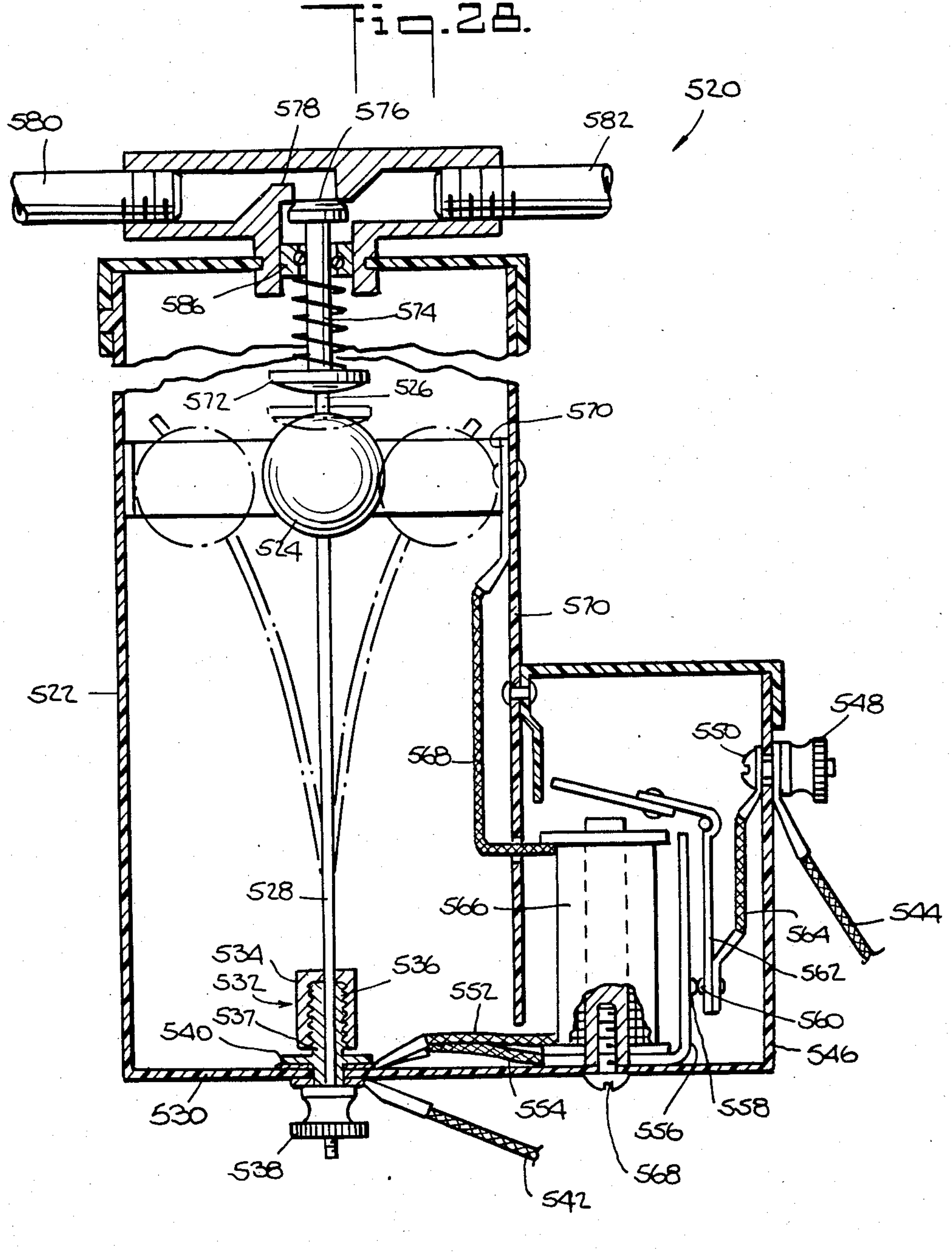

Still another embodiment of the flow control means is indicated by the reference number 520 in FIG. 28. The flow control means 520 includes a receptacle 522 formed of a material that does not conduct electricity. The receptacle 522 contains a spherical weight 524 made of a high density electrically conductive material. The weight 524 is affixed to an end portion 526 of a flexible shaft 528 also formed of an electrically conductive material. The shaft 528 is affixed to a base 530 of the receptacle 522 by a locking means 532.

The locking means 532 includes a lock nut 534 engaged on an electrically conductive gripping screw 536 having an extension 537 that passes through the base 530 for engagement with an electrically conductive thumb nut 538. The extension 537 is provided with a flange 540 that is drawn toward the base 530 as the thumb nut 538 engages the extension 537.

A cable 542 which corresponds to the cable 284 of FIG. 17, is secured to the outside of the base 530 by the thumb nut 538, and a cable 544, which corresponds to the cable 286 of FIG. 17, is secured to a sidewall 546 of the receptacle 522 by an electrically conductive thumb nut 548, and an electrically conductive screw 550. A pair of cables 552 and 554 are held against the inside of the base 530 by the flange 540. The cable 554 connects to an electrically conductive angle piece 556 having a contact 558 that engages a contact 560 on an electrically conductive spring strip 562. A cable 564 has one end connected to the spring strip 562 and an opposite end connected to the screw 550. Accordingly, a conductive path is normally established between the cable 542 and the cable 544.

The cable 552 is connected to one end of a coil 566 secured on the base 530 by a screw 568. The opposite end of the coil 566 is connected to a cable 568 that attaches to an annular conductive strip 570 secured inside the receptacle 522. Thus a complete electrical path for the coil 566 does not normally exist between the cables 552 and 568.

Under normal conditions the end portion 526 of the shaft 528 engages against an end cap 572 of a valve member 574. The valve member 574 is in a normally closed position, wherein a valve head 576 normally engages a valve seat 578 to prevent flow from an inlet tube 580 to an outlet tube 582. A biasing spring 584, disposed between the end cap 572 and a collar 586, biases the valve head 576 away from the valve seat 578.

In view of the above it will be seen that the several objects of the invention are achieved and other advantageous results attained.

As various changes can be made in the above constructions without departing from the scope of the invention, it is intended that all matter contained in the above description or shown in the accompanying drawings shall be interpreted as illustrative and not in a limiting sense.

What is claimed is:

1. A circumbendibus safety system for dispensing fire extinguishant material into the fuel tank of a vehicle comprising, (a) valve means comprising a first valve through which said fire extinguishant material is dispensed into said fuel tank, said first valve having a normally closed position to prevent dispensation of said fire extinguishant material into said fuel tank and an open position for permitting dispensation of said fire extinguishant material into said fuel tank, (b) sensing means on said fuel tank for sensing a predetermined distortion of said fuel tank and moving a predetermined amount in response to said predetermined distortion, (c) transmission means actuatable by said sensing means for moving said first valve from said normally closed position to said open position when said sensing means has moved said predetermined amount upon sensing said predetermined distortion.

2. The system as claimed in claim 1, wherein the means for dispensing fire extinguishing material into the fuel tank comprise, valve means comprising a first valve through which said fire extinguishant material is dispensed into said fuel tank, said first valve having a normally closed position to prevent dispensation of said fire extinguishant material into said fuel tank and an open position for permitting dispensation of said fire extinguishant material into said fuel tank, sensing means on said fuel tank for sensing a predetermined impact on said vehicle and moving a predetermined amount in response to said predetermined impact, transmission means actuatable by said sensing means for moving said first valve from said normally closed position to said open position when said sensing means has moved said predetermined amount upon sensing said predetermined impact.

3. The system as claimed in claim 2, wherein said sensing means comprise a deflection means having a first predetermined position when said vehicle is free from impact and having a second predetermined position when said vehicle is impacted a predetermined amount such that said change of position of said deflection means causes movement of said transmission means.

4. The system as claimed in claim 3, wherein said deflection means is disposed outside said fuel tank.

5. The system as claimed in claim 2, wherein said fuel tank has walls and said transmission means comprise a rotatable member pivoted for rotation in said fuel tank, said deflection means including a deflection unit having one end connected to a wall of said fuel tank and another end connected to said rotatable member away from and out of alignment with the pivot such that said change in position of said deflection unit causes rotation of said rotatable member.

6. The system as claimed in claim 5, wherein a plurality of said deflection units are connected to said rotatable member and to respective walls of said fuel tank.

7. The system as claimed in claim 5, wherein said first valve has a valve rod and said transmission means further comprise a link member connected to said first valve rod and said rotatable member such that rotation of said rotatable member causes said link member to move said first valve rod to shift said first valve from said closed position to said open position.

8. The system as claimed in claim 7, wherein said valve means further comprise a thermal actuated valve in series with said first valve, said thermal actuated valve having a normally closed position and being moveable to an open position at a predetermined temperature level.

9. The system as claimed in claim 2, wherein said deflection means comprises a deflection member pivotable about a deflection axis and surrounding said fuel tank, said deflection member normally having a first predetermined angular position about said axis when said vehicle is free from impact, and a second predetermined angular position about said axis when said vehicle has been impacted said predetermined amount such that the difference between said first and second angular positions causes movement of said transmission means.

10. The system as claimed in claim 9, wherein said deflection member is generally rectangular.

11. The system as claimed in claim 10, wherein said deflection member and said fuel tank have first corresponding corner portions and joining means to join said deflection member to said fuel tank at said first corresponding corner portions.

12. The system as claimed in claim 11, wherein said deflection member has a second corner portion diagonally opposite said first corner portion, and linking means joining said second corner portion to said transmission means.

13. The system as claimed in claim 12, wherein said linking means include a rotatable shaft for transmitting rotation to said transmission means, and a link member connected to said rotatable shaft for converting deflective movement of said deflection member to rotational movement of said rotatable shaft.

14. The system as claimed in claim 13, wherein said first valve has a spring biased valve rod that normally maintains said first valve in said closed position, said valve rod being moveable a predetermined amount to place said first valve in said open position, and said transmission means includes a cam member engageable with said valve rod to restrain said spring bias and prevent said valve rod from moving said predetermined amount, said rotatable shaft causing movement of said cam member out of engagement with said valve rod to permit the spring bias of said valve rod to move said valve rod said predetermined amount to place said first valve in said open position upon a predetermined rotational movement of said rotatable shaft.

15. The system as claimed in claim 14, wherein said valve means further comprises a thermal actuated valve in series with said first valve, said thermal actuated valve having a normally closed position and being moveable to an open position at a predetermined temperature level.

16. A circumbendibus safety system for dispensing fire extinguishant material into the fuel tank of a vehicle comprising, (a) valve means comprising a first valve through which said fire extinguishant material is dispensed into said fuel tank, said first valve having a normally closed position to prevent dispensation of said fire extinguishant material into said fuel tank and an open position for permitting dispensation of said fire extinguishant material into said fuel tank, (b) sensing means on said fuel tank for sensing a predetermined impact on said vehicle and moving a predetermined amount in response to said predetermined impact, (c) transmission means actuatable by said sensing means for moving said first valve from said normally closed position to said open position when said sensing means has moved said predetermined amount upon sensing said predetermined impact.

* * * * *